United States Patent
Jepson et al.

(10) Patent No.: US 11,430,088 B2
(45) Date of Patent: Aug. 30, 2022

(54) METHOD AND APPARATUS FOR DATA ANONYMIZATION

(71) Applicant: SAMSUNG ELECTRONICS CO., LTD., Suwon-si (KR)

(72) Inventors: Allan Jepson, Toronto (CA); Aleksai Levinshtein, Toronto (CA); Mete Kemertas, Toronto (CA); Haotian Zhang, Toronto (CA); Hoda Rezaee Kaviani, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 353 days.

(21) Appl. No.: 16/725,717

(22) Filed: Dec. 23, 2019

(65) Prior Publication Data

US 2021/0192693 A1 Jun. 24, 2021

(51) Int. Cl.
| | |
|---|---|
| *G06F 21/62* | (2013.01) |
| *G06N 3/08* | (2006.01) |
| *G06N 20/20* | (2019.01) |
| *G06N 3/04* | (2006.01) |
| *G06T 5/00* | (2006.01) |

(52) U.S. Cl.
CPC ........ *G06T 5/001* (2013.01); *G06F 21/6254* (2013.01); *G06N 3/0454* (2013.01); *G06N 3/084* (2013.01); *G06N 20/20* (2019.01); *G06F 2221/2113* (2013.01); *G06T 2207/20081* (2013.01); *G06T 2207/20084* (2013.01)

(58) Field of Classification Search
CPC ........ G06F 21/6254; G06F 2221/2113; G06N 20/20; G06N 3/0454; G06N 3/084; G06T 2207/20081; G06T 2207/20084; G06T 5/001
See application file for complete search history.

(56) References Cited

U.S. PATENT DOCUMENTS

| | | |
|---|---|---|
| 9,298,931 B2 | 3/2016 | Ur et al. |
| 10,423,845 B2 | 9/2019 | Miller et al. |
| 10,546,185 B2 | 1/2020 | Sasaki |
| (Continued) | | |

FOREIGN PATENT DOCUMENTS

| | | |
|---|---|---|
| JP | 2017-108374 A | 6/2017 |
| KR | 10-2015-0000192 A | 1/2015 |
| KR | 10-2017-0136576 A1 | 12/2017 |

OTHER PUBLICATIONS

Lyudmila Kopeykina, "Automatic Privacy Detection in Scanned Document Images Based on Deep Neural Networks," Oct. 14, 2019, 2019 International Russian Automation Conference (RusAutoCon),pp. 2-5.*

(Continued)

*Primary Examiner* — Omar S Ismail
(74) *Attorney, Agent, or Firm* — Sughrue Mion, PLLC

(57) ABSTRACT

An apparatus for scrubbing an image may include a memory storing instructions; and a processor configured to execute the instructions to: receive an input image; input a preset public attribute to an encoder neural network; obtain a scrubbed feature from the input image based on the preset public attribute, via the encoder neural network; wherein the encoder neural network is trained based on an amount of information in the scrubbed feature about the input image, and an estimated public attribute estimated from the scrubbed feature.

26 Claims, 13 Drawing Sheets

(56) References Cited

U.S. PATENT DOCUMENTS

| | | | |
|---|---|---|---|
| 10,650,315 B2* | 5/2020 | Mudie | G06K 9/6267 |
| 2016/0350336 A1* | 12/2016 | Checka | G06F 16/5866 |
| 2016/0364615 A1 | 12/2016 | Sakoda et al. | |
| 2017/0148487 A1 | 5/2017 | Krishnakumar et al. | |
| 2017/0154207 A1 | 6/2017 | Sasaki | |
| 2018/0068192 A1 | 3/2018 | Miller et al. | |
| 2018/0165546 A1* | 6/2018 | Skans | G06K 9/6234 |
| 2018/0234588 A1 | 8/2018 | Chen | |
| 2018/0293466 A1* | 10/2018 | Viswanathan | G06V 20/56 |
| 2018/0293706 A1* | 10/2018 | Viswanathan | G06T 3/4046 |
| 2018/0357435 A1 | 12/2018 | Lee et al. | |
| 2019/0045270 A1 | 2/2019 | Vats | |
| 2019/0080098 A1 | 3/2019 | Garralda et al. | |
| 2019/0130545 A1* | 5/2019 | Cardei | G06V 10/60 |
| 2019/0171929 A1* | 6/2019 | Abadi | G06N 3/0454 |
| 2019/0188830 A1* | 6/2019 | Edwards | G06N 3/0472 |
| 2019/0327366 A1 | 10/2019 | Kimura | |
| 2020/0036528 A1* | 1/2020 | Ortiz | H04L 63/0861 |
| 2020/0265294 A1* | 8/2020 | Kim | G06T 13/80 |
| 2021/0027531 A1* | 1/2021 | Liu | A63F 13/80 |
| 2021/0118020 A1* | 4/2021 | Agarwal | G06Q 30/0625 |

OTHER PUBLICATIONS

Zhongzheng Ren,"Learning to Anonymize Faces for Privacy Preserving Action Detection,"Sep. 2018, Proceedings of the European Conference on Computer Vision (ECCV), 2018,pp. 1-14.*

Aria Rezaei,"Protecting Sensitive Attributes via Generative Adversarial Networks,"Dec. 26, 2018, https://www.researchgate.net/publication/329945624,arXiv:1812.10193v1 [cs.LG],pp. 2-6.*

International Search Report and Written Opinion dated Sep. 21, 2020 by the International Searching Authority in counterpart International patent Application No. PCT/KR2020/002088. (PCT/ISA/210/220/237).

Nicholas Frosst et al., "Analyzing and Improving Representations with the Soft Nearest Neighbor Loss", arXiv:1902.01889v1, Feb. 2019, 16 pages total.

Mohamed Ishmael Belghazi et al., "Mutual Information Neural Estimation", arXiv:1801.04062v5, Aug. 2021, 18 pages total.

Chong Huang et al., "Generative Adversarial Privacy", arXiv:1807.05306v3, Jun. 2019, 3 pages total.

Ardhendu Tripathy et al., "Privacy-Preserving Adversarial Networks", arXiv:1712.07008v3, Jun. 2019, 16 pages total.

Avishek Joey Bose et al., "Adversarial Attacks on Face Detectors using Neural Net based Constrained Optimization", arXiv:1805.12302v1, May 2018, 6 pages total.

Meng Li et al., "Privynet: A Flexible Framework for Privacy-Preserving Deep Neural Network Training", arXiv:1709.06161v3, Jan. 2018, 20 pages total.

Qiang Zhu et al., "2P-DNN : Privacy-Preserving Deep Neural Networks Based on Homomorphic Cryptosystem", arXiv:1807.08459, 2018, 12 pages total.

Jihun Hamm, "Minimax Filter: Learning to Preserve Privacy from Inference Attacks", arXiv:1610.03577v3, Dec. 2017, 31 pages total.

Jiawei Chen et al., "VGAN-Based Image Representation Learning for Privacy-Preserving Facial Expression Recognition", arXiv:1803.07100v2, Sep. 2018, 10 pages total.

Witold Oleszkiewicz et al., "Siamese Generative Adversarial Privatizer for Biometric Data", arXiv:1804.08757v3, Oct. 2018, 16 pages total.

Zhenyu Wu et al., "Towards Privacy-Preserving Visual Recognition via Adversarial Training: A Pilot Study", Computer Vision Foundation, 2018, 19 pages total.

Henri Rebecq et al., "High Speed and High Dynamic Range Video with an Event Camera", arXiv:1906.07165v1, Jun. 2019, 26 pages total.

Carlos M. Carvalho et al., "The Horseshoe Estimator for Sparse Signals", Oct. 2008, 30 pages total.

* cited by examiner

METHOD AND APPARATUS FOR DATA ANONYMIZATION

FIELD

Methods and apparatuses consistent with embodiments relate to generating anonymized images in which private features are removed and one or more public attributes are contained.

BACKGROUND

In the field of data flow and publishing, there is a concern for controlling information leakage and limiting the possibility of inferring sensitive information from observables. For example, when a consumer service provider collects consumer data to analyze the consumer's activity, preference, and lifestyle, and the like, and then to provide relevant product or service recommendations based on the collected data, consumers may be concerned about their personal privacy because there is a possibility that the collected data is leaked to third parties.

Anonymization techniques such as generalization and bucketization have been introduced to provide privacy protection. In a related method, upon collection of consumer's data, data processing is performed on the collected data to modify sensitive personal information while preserving analytically useful data, prior to releasing the collected data to a third party.

For the data collection to be effective, two requirements of utility and privacy should be satisfied. In other words, a target task should be accomplished accurately based on the released data, while the leakage of private information should be constrained within a certain range.

Since privacy and utility have a trade-off relationship, there is a need for a data anonymization method that can balance between the requirement of minimizing distortion of analytically useful data to provide utility and the requirement of minimizing leakage of sensitive personal information to preserve privacy.

SUMMARY

According to an aspect of the disclosure, an apparatus for scrubbing an image may include: a memory storing instructions; and a processor configured to execute the instructions to: receive an input image; input a preset public attribute to an encoder neural network; and obtain a scrubbed feature from the input image based on the preset public attribute, via the encoder neural network, wherein the encoder neural network is trained based on an estimated public attribute estimated from the scrubbed feature and an amount of information in the scrubbed feature about the input image.

The processor may be further configured to execute the instructions to: obtain the scrubbed feature from the input image based on the preset public attribute without inputting a preset private attribute to the encoder neural network.

The encoder neural network may be trained to minimize a sum of a difference between the estimated public attribute and the preset public attribute, and the amount of information in the scrubbed feature about the input image.

The encoder neural network may be determined to be trained to minimize the sum of the difference between the estimated public attribute and the preset public attribute, and the amount of information in the scrubbed feature about the input image, when the sum becomes less than a predetermined threshold value.

The encoder neural network may be jointly trained with a target task neural network configured to obtain the estimated public attribute from the scrubbed feature, and a bottleneck neural network configured to determine the amount of information in the scrubbed feature about the input image.

The apparatus may further include: a communication interface configured to establish a connection to an external device comprising the target task neural network, wherein the processor is further configured to execute the instructions to: control the communication interface to transmit the scrubbed feature to the target task neural network.

The apparatus may further include: a display; and a communication interface configured to establish a connection to an external device comprising a target task neural network configured to obtain the estimated public attribute from the scrubbed feature, and a decoder neural network configured to generate a reconstructed image from the scrubbed feature to reconstruct the input image, wherein the processor is further configured to execute the instructions to: control the communication interface to receive the reconstructed image from the external device, and control the display to display the reconstructed image.

The apparatus may further include: a display, wherein the processor is further configured to execute the instructions to: generate a reconstructed image from the scrubbed feature to reconstruct the input image, via a decoder neural network; and control the display to display the reconstructed image.

The processor may be further configured to execute the instructions to: provide a user interface that allows a user to set a privacy level; and obtain the scrubbed feature from the input image based on the privacy level and the preset public attribute, via the encoder neural network The processor may be further configured to execute the instructions to: extract a content fingerprint from a content presented to a user; generate a time stamp indicating a time at which the content fingerprint is extracted; and transmit the content fingerprint and the time stamp to a device configured to obtain the public attribute estimated from the scrubbed feature.

According to an aspect of the disclosure, an apparatus for scrubbing an image may include: a memory storing instructions; a processor configured to execute the instructions to: receive a scrubbed feature in which an original input signal is scrubbed based on a preset public attribute; input the scrubbed feature to a target task neural network; and extract the preset public attribute from the scrubbed feature, as an estimated public attribute, via the target task neural network, wherein the target task neural network is trained based on the estimated public attribute, and an amount of information in the scrubbed feature about the input image.

The target task neural network may be trained to minimize a sum of the difference between the estimated public attribute and the preset public attribute, and the amount of information in the scrubbed feature about the input image.

The target task neural network may be jointly trained with an encoder neural network configured to generate the scrubbed feature, and a bottleneck neural network configured to determine the amount of information in the scrubbed feature about the input image.

When the scrubbed feature may be generated based on a preset private attribute and the preset public attribute; the processor is further configured to execute the instructions to: extract the preset private attribute from the scrubbed feature, via an adversarial neural network.

The target task neural network may be trained jointly with an encoder neural network configured to generate the scrubbed feature, and a bottleneck neural network configured to determine the amount of information in the scrubbed feature about the input image, but separately from training of the adversarial neural network.

The processor may be further configured to execute the instructions to: input the scrubbed feature to a decoder neural network; and generate a reconstructed image of the original input signal from the scrubbed signal, via the decoder neural network.

According to an aspect of the disclosure, a method for scrubbing an image may include: receiving an input image; inputting a preset public attribute to an encoder neural network; and obtaining a scrubbed feature from the input image based on the preset public attribute, via the encoder neural network, wherein the encoder neural network is trained based on an estimated public attribute estimated from the scrubbed feature and an amount of information in the scrubbed feature about the input image.

The obtaining the scrubbed feature may include: obtaining the scrubbed feature from the input image based on the preset public attribute without inputting a preset private attribute to the encoder neural network.

The encoder neural network may be trained to minimize a sum of a difference between the estimated public attribute and the preset public attribute, and the amount of information in the scrubbed feature about the input image.

The encoder neural network may be jointly trained with a target task neural network configured to obtain the estimated public attribute from the scrubbed feature, and a bottleneck neural network configured to determine the amount of information in the scrubbed feature about the input image.

The method may further include: establishing a connection to an external device comprising the target task neural network; and transmitting the scrubbed feature to the target task neural network.

The method may further include: establishing a connection to an external device comprising a target task neural network configured to obtain the estimated public attribute from the scrubbed feature, and a decoder neural network configured to generate a reconstructed image from the scrubbed feature to reconstruct the input image; receiving the reconstructed image from the external device; and displaying the reconstructed image.

The method may further include: generating a reconstructed image from the scrubbed feature to reconstruct the input image, via a decoder neural network; and displaying the reconstructed image.

The method may further include: providing a user interface that allows a user to set a privacy level; and obtaining the scrubbed feature from the input image based on the privacy level and the preset public attribute, via the encoder neural network.

According to an aspect of the disclosure, a method of scrubbing an image may include: receiving a scrubbed feature in which an original input signal is scrubbed based on a preset public attribute; inputting the scrubbed feature to a target task neural network; and extracting the preset public attribute from the scrubbed feature, as an estimated public attribute, via the target task neural network, wherein the target task neural network is trained based on the estimated public attribute, and an amount of information in the scrubbed feature about the input image.

The target task neural network may be trained to minimize a sum of the difference between the estimated public attribute and the preset public attribute, and the amount of information in the scrubbed feature about the input image.

The target task neural network may be jointly trained with an encoder neural network configured to generate the scrubbed feature, and a bottleneck neural network configured to determine the amount of information in the scrubbed feature about the input image.

When the scrubbed feature is generated based on a preset private attribute and the preset public attribute, the method may further include: extracting the preset private attribute from the scrubbed feature, as an estimated private attribute, via an adversarial neural network.

The target task neural network may be trained jointly with an encoder neural network configured to generate the scrubbed feature, and a bottleneck neural network configured to determine the amount of information in the scrubbed feature about the input image, but separately from training of the adversarial neural network.

The method may further include: inputting the scrubbed feature to a decoder neural network; and generating a reconstructed image of the original input signal from the scrubbed signal, via the decoder neural network.

While the afore described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
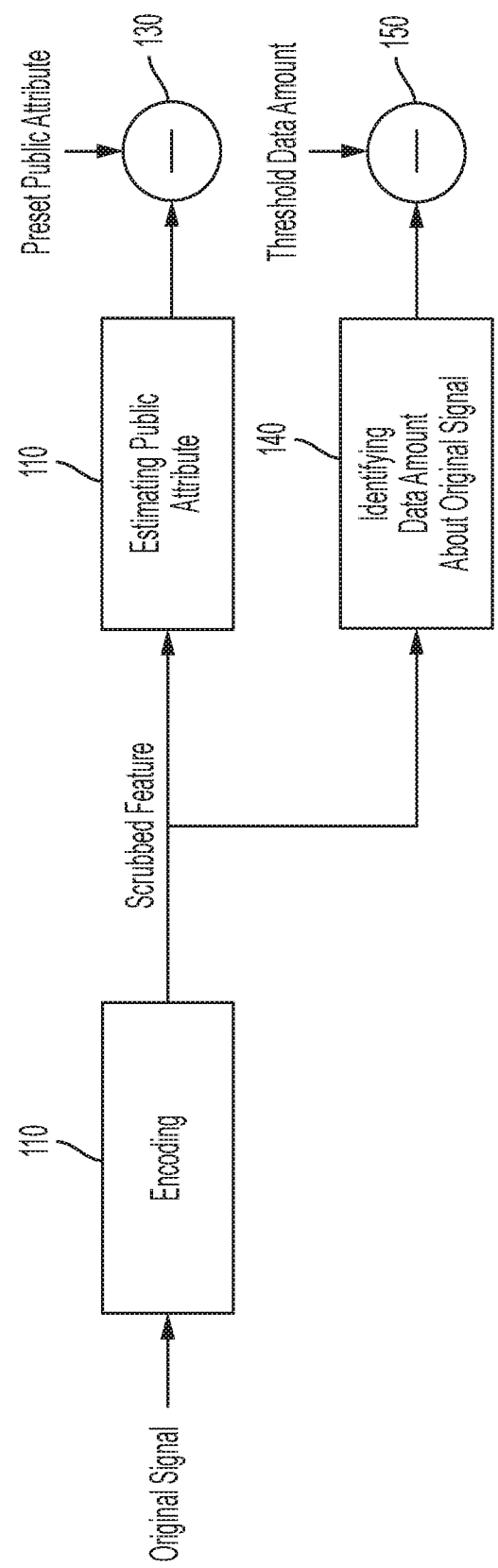
FIG. 1 is a diagram for describing a data anonymizing process according to embodiments.

Embodiments of the present disclosure provide an artificial intelligence (AI) data anonymizing apparatus and an operating method thereof, in which privacy information is removed from data sets without destroying the utility of anonymized data by using neural networks so that people whom the data describe remain anonymous while the data utility is preserved.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

An 'original signal', "input signal," or "original input signal" may include a voice signal, a text signal, and/or an image signal which is detected by a microphone, an input interface as such a keyboard or a touch screen, or a camera. Also, an original signal, an input signal, or an original input signal can be understood as a signal to be an object of AI encoding process.

Also, in the present specification, an 'image' or a 'picture' may denote a still image, a moving image including a plurality of consecutive still images (or frames), or a video.

Also, in the present specification, a neural network is a representative example of an artificial intelligence model, but embodiments are not limited to an artificial intelligence model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a diagram for describing a data anonymizing process according to embodiments.

As shown in FIG. 1, an encoding process 110 is performed on an original signal to obtain a scrubbed feature, based on a given or preset public attribute. A public attribute is an attribute that is allowed to be transmitted out from a secure location (e.g., a client device with a sensor that detects the original signal) and is given for the data anonymizing process. A single public attribute may be given as a default value. In another example, a plurality of public attributes may be given and a user is allowed to select one of the plurality of public attributes. For example, the public attribute may be set to a user's emotion. However, examples of the public attribute are not limited to a user's emotion, and may include any one or any combination of a user's emotion, gender, identification, age, body gesture, hand gesture, body pose, gaze direction, finger direction, clothes, and accessories. The preset public attribute(s) may be used as a label in computing a neural network loss.

The original signal may be scrubbed through the encoding process 110 to be transformed to a scrubbed feature, so that the scrubbed feature contains information of the public attribute, with a minimized amount of information about the original signal.

A public attribute estimating process 120 is performed on the scrubbed feature to estimate a public attribute from the scrubbed feature. The estimated public attribute is not always the same as the preset public attribute since the scrubbed feature is used as input of the public attribute estimating process 120.

A first comparison process 130 is performed on the estimated public attribute in comparison with a preset public attribute. The preset public attribute may be also referred to a labeled public attribute or a public attribute label. In the first comparison process 130, a difference between the estimated public attribute and the public attribute label is calculated, as a first loss.

A data amount identifying process 140 is performed on the scrubbed feature to identify an amount of data in the scrubbed feature about the original signal. The less amount of data the scrubbed feature contains about the original signal, the higher privacy protection and data anonymization are achieved. The data amount identifying process 140 may presume that the more the data about the original signal exists in the scrubbed feature, the more the data about non-public attributes or undefined private attributes exist in the scrubbed feature.

A second comparison process 150 is performed on the identified amount of data in the scrubbed feature about the original signal in comparison with a threshold data amount. In the second comparison process 130, a difference between the identified amount of data about the original signal and the threshold data amount, is calculated, as a second loss. When the threshold data amount is set to zero, the second comparison process 150 may be omitted and the output from the data amount identifying process 140 may be used as the second loss.

The encoding process 110, the public attribute estimating process 120, and the data amount identifying process 140 may be updated based on the first loss and the second loss. In particular, neural network parameters (e.g., weights and biases) for the encoding process 110, the public attribute estimating process 120, and the data amount identifying process 140 may be updated to minimize the first loss and the second loss.

In accordance with embodiments of the present disclosure, the data anonymizing process enables a public attribute to be transmitted out to a third party while restricting transmission of any other information (i.e., non-public attributes or undefined private attributes) by converting the original signal to the scrubbed feature.

Figure 2:
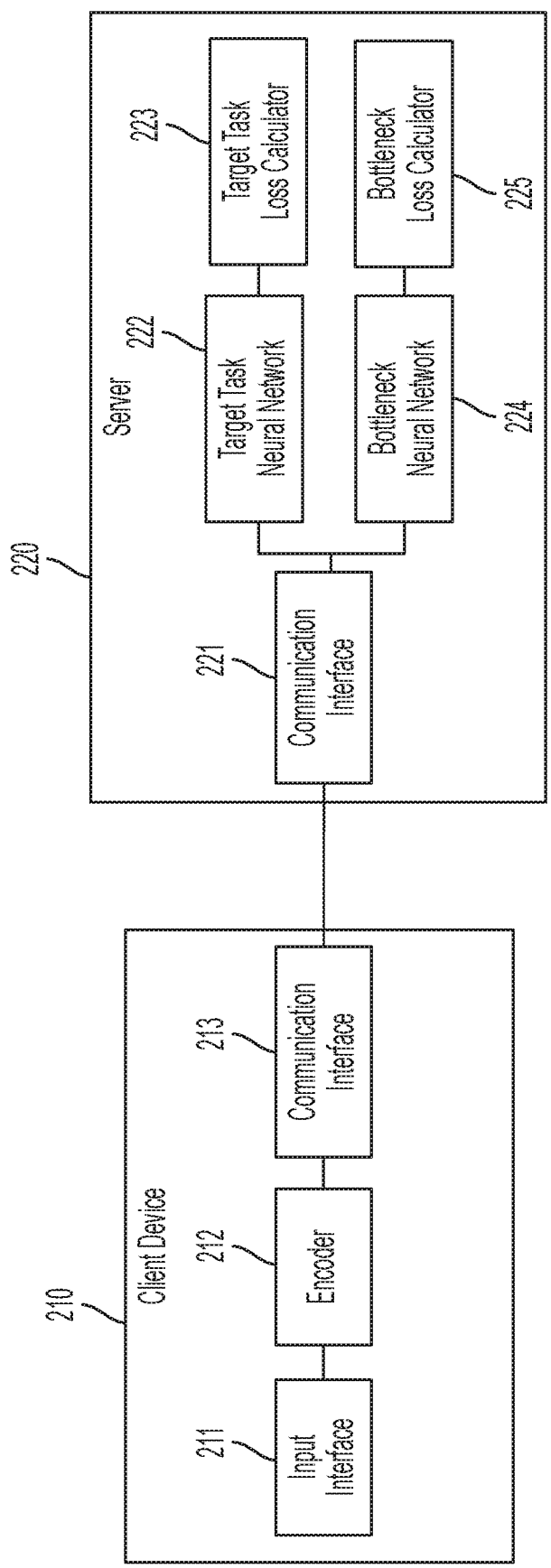
FIG. 2 is a block diagram of a configuration of an image anonymizing system according to embodiments.

FIG. 2 is a block diagram of a configuration of an image anonymizing system according to embodiments.

As shown in FIG. 2, the image anonymizing system according to embodiments includes a client device 210 and a server 220.

The client device 210 may be implemented as a television, a smartphone, a laptop, a desktop, or the like. The server 200 may be implemented as, for example, a cloud server running in a cloud computing environment. The server 200 may be a content provider server, an application server, or a video streaming service server.

The client device 210 may include an input interface 211, an encoder 212, and a communication interface 213.

The input interface 211 may include a camera, a microphone, a keyboard, and/or a touchpad to receive an input signal. For example, the input interface 211 may capture an image of a user of the client device 210 using the camera and provide the captured image to the encoder 212 as an original signal.

The encoder 212 may convert the original signal to a scrubbed feature based on a preset public attribute. For example, the original signal may be a facial image of a user of the client 210, and the preset public attribute may be an attribute related to an emotion of the user (e.g., whether the user is smiling or not).

The encoder 212 may include an encoder neural network including an input layer, one or more hidden layers, and an output layer, and may process the original signal through the encoder neural network to obtain the scrubbed feature by preserving the public attribute while reducing an amount of data about the original signal. The data about the original signal in the scrubbed feature may be considered as including data about non-public attributes or undefined private attributes.

The communication interface 213 may establish a connection between the client device 210 and the server 220. The connection may be a wireless communication or a wired communication. The communication interface 213 may transmit the scrubbed feature to the server 220.

The server 200 may include a communication interface 221, a target task neural network 222, a target task loss calculator 223, a bottleneck neural network 224, and a bottleneck loss calculator 225.

The communication interface 211 may receive the scrubbed feature from the client device 210, and may transmit the scrubbed feature to the target task neural network 222 and the bottleneck neural network 224.

The target task neural network 222 may perform the public attribute estimating process 120 on the scrubbed feature to estimate a public attribute from the scrubbed feature. The estimated public attribute is not always the same as the preset public attribute since the scrubbed feature is used as input of the target task neural network 222.

The target task loss calculator 223 may perform the first comparison process 130 on the estimated public attribute to compare the estimate public attribute with the preset public attribute. In particular, the target task loss calculator 223 may calculate a difference between the estimated public attribute and the preset public attribute, as a target task loss. The target task loss may be also referred to as error metrics of the target task neural network 222.

The bottleneck neural network 224 may perform the data amount identifying process 140 on the scrubbed feature. Specifically, the bottleneck neural network 224 may estimate or identify the amount of data in the scrubbed feature about the original signal. The less amount of data the scrubbed feature contains about the original signal, the higher privacy protection and data anonymization are provided. The bottleneck neural network 224 may presume that the data about the original signal in the scrubbed feature include data about non-public attributes or undefined private attributes.

The bottleneck loss calculator 225 may perform the second comparison process 150 on the identified amount of data in the scrubbed feature about the original signal in comparison with a threshold data amount (e.g., zero) to calculate a bottleneck loss. For example, the threshold data amount may be set to zero so that the bottleneck loss represents the identified amount of data in the scrubbed feature about the original signal. In that case, the bottleneck loss calculator 225 may be omitted and the output of the bottleneck neural network 224 may be used as the bottleneck loss.

The target task loss and the bottleneck loss may be back propagated to the target task neural network 222, the bottleneck neural network 224, and the encoder neural network of the encoder 212 to jointly train the neural network of encoder 212 and the neural networks 222 and 224 and thereby to minimize the target task loss and the bottleneck loss. The neural network of encoder 212 and the neural networks 222 and 224 are trained iteratively using optimization techniques like gradient descent. At each cycle of training, the target task loss and the bottleneck loss (i.e., error metrics) are calculated based on the difference between the estimated public attribute and the preset public attribute (i.e., a target value) and the difference between the amount of data in the scrubbed feature about the original signal and a zero value. The derivatives of the target task loss and the bottleneck loss may be calculated and propagated back through the neural network of encoder 212 and the neural networks 222 and 224 using a technique called backpropagation. The neural network of encoder 212 and the neural networks 222 and 224 are trained in a manner in which each neuron's coefficients/weights are adjusted relative to how much the neurons contributed to the total loss of the target task loss and the bottleneck loss in the previous training cycle. The process is repeated iteratively until the total loss of the neural network of encoder 212 and the neural networks 222 and 224 drops below a predetermined threshold. When the total loss is below the predetermined threshold, the image anonymizing system determines that the target task loss and the bottleneck loss are minimized. The minimization of the target task loss and the bottleneck loss may lead to improvement in privacy protection and data utility.

In FIG. 2, the encoder 212 is illustrated as being disposed in the client device 210 separately from the target task neural network 222, the target task loss calculator 223, the bottleneck neural network 224, and the bottleneck loss calculator 225 that are located in the server 220, but the embodiments are not limited thereto, and the encoder 212, the target task neural network 222, the target task loss calculator 223, the bottleneck neural network 224, and the bottleneck loss calculator 225 may be trained in one processor, or one computer system including a plurality of processors.

Figure 3:
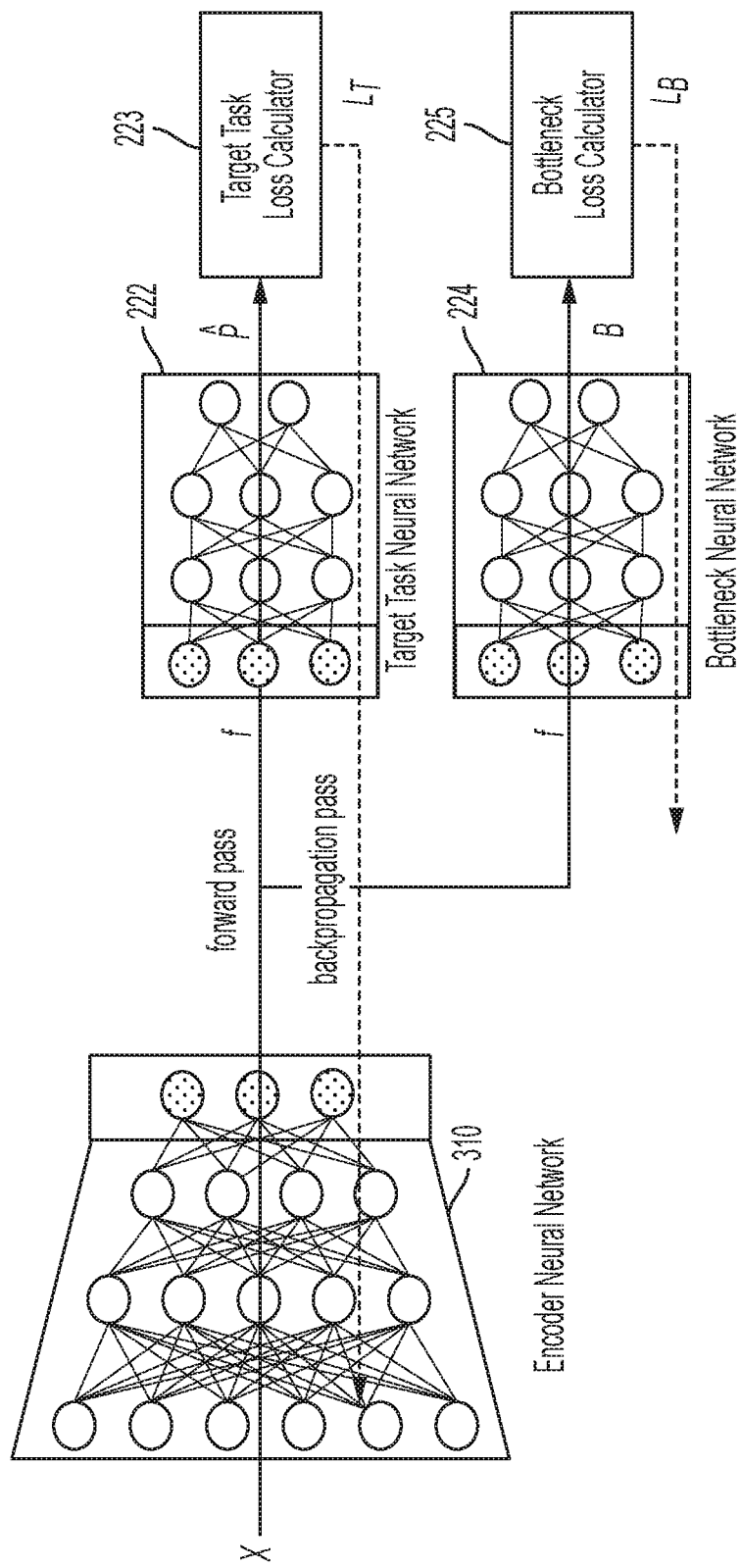
FIG. 3 is a diagram for describing a method of training an encoder neural network, a target task neural network, and a bottleneck neural network according to embodiments.

FIG. 3 is a diagram for describing a method of training an encoder neural network, a target task neural network, and a bottleneck neural network according to embodiments;

As shown in FIG. 3, an encoder neural network 310, a target task neural network 222, a target task loss calculator 223, a bottleneck neural network 224, and a bottleneck loss calculator 225 are provided to anonymize data while preserving a public attribute of the data.

The encoder neural network 310 may have an input layer, one or more hidden layers, and an output layer. The input layer may accept an input signal X including at least one of an image, a voice, and text. For example, the input signal X may be obtained from a camera, a microphone, a keyboard, a touchscreen, and an external device, or may be retrieved from a local storage. The encoder neural network 310 may process the input signal X through the hidden layers to convert the input signal X to a scrubbed feature f based on a preset public attribute P. The scrubbed feature f is output from the output layer of the encoder neural network 10. The scrubbed feature f may contain data from which the public attribute P of the input signal X can be estimated using another neural network.

For example, the input signal X may be an image of one or more users, and the public attribute may be at least one of a number of heads, head orientations, and facial expression of the one or more users in the image, but may not include an identification and a gender. However, examples of the input signal X and the public attribute P are not limited thereto. The public attribute P may be predetermined, or may be selected by an operator or a user.

The encoder neural network 310 may compute the scrubbed feature f (i.e., f=E(X)) to provide information about the public attribute P but minimize information of non-public attributes. The non-public attributes may refer to all the attributes (or information) of the input signal X other than the public attribute P. For example, when the public attribute P is a feature indicating whether the user is smiling or not, the non-public attributes are all the attributes (e.g., gender, ID, age, etc.) of the input signal X, except for the public attribute P indicating whether the user is smiling or not.

In embodiments of the present disclosure, a private attribute Q may not be specified and may be set to be empty, so that the encoder neural network 10 scrubs all the information other than the public attribute P. In another embodiment, the private attributes Q is set to a certain sensitive feature, such as gender, so that the encoder neural network 310 may scrub or distort the given sensitive feature of the input signal X with a higher privacy standard.

The target task neural network 222 may include an input layer, one or more hidden layers, and an output layer. The input layer may receive the scrubbed feature f that is output from the encoder neural network 310. The target task neural network 222 may process the scrubbed feature f through the hidden layers to extract the public attribute P as an estimated public attribute P. The output layer may output the estimated public attribute P, which may be represented as a softmax response over the public attribute P.

The target task loss calculator 223 may calculate a target task loss $L_T$ that represents the system's performance on inferring the public attribute P from the scrubbed feature f. When the public attribute P is a discrete attribute, the target task loss calculator 223 calculates a cross-entropy loss as the target task loss $L_T$.

The bottleneck neural network 224 may include an input layer, one or more hidden layers, and an output layer. The input layer of the bottleneck neural network 224 may receive the scrubbed feature f. In the forward pass, the bottleneck neural network 224 may process the scrubbed feature f through the hidden layers to estimate an amount B of information in the scrubbed feature f about the input signal X.

The bottleneck neural network 224 may cause the encoder neural network 310 to minimize the amount B of information about the input signal, given that the encoder neural network 310 needs to provide information about the public attribute P.

For example, the bottleneck neural network 224 may cause the encoder neural network 310 to minimize the amount B based on one of the following methods: a clustering method in which the bottleneck neural network 224 causes the encoder neural network 310 to cluster a scrubbed feature when discrete public attributes are provided; a sparsity method in which the bottleneck neural network 224 causes the encoder neural network 310 to generate a sparse scrubbed feature, and a sparsity plus coring method in which the bottleneck neural network 224 causes the encoder neural network 310 to generate a scrubbed feature having minimum mutual information of private attributes.

The bottleneck loss calculator 225 may calculate a bottleneck loss $L_B$ that represents the amount B of information in the scrubbed feature f about the input signal X. The bottleneck loss $L_B$ may increase in proportion to the amount B.

The encoder neural network 310, the target task neural network 222, and the bottleneck neural network 224 are jointly trained using the target task loss $L_T$ and the bottleneck loss $L_B$.

The target task loss $L_T$ and the bottleneck loss $L_B$ are propagated back to the target task neural network 222, the bottleneck neural network 224, and the encoder neural network 310 to minimize the following loss:

$$\min_{E,T,B} L_T + \alpha L_B,$$

wherein E denotes the encoder neural network 310, T denotes the target task neural network 222, B denotes bottleneck neural network 224, and α is a weighting factor.

During the training phase, the encoder neural network 310 may be positioned on a client side, and the target task neural network 222, the bottleneck neural network 224, the target task loss calculator 223, and the bottleneck loss calculator 225 may be positioned on a server side, but embodiments are not limited thereto. In another example, the encoder neural network 310, the target task neural network 222, the bottleneck neural network 224, the target task loss calculator 223, and the bottleneck loss calculator 225 may be executed in the same computing system including one or more processors and one or more storages.

Figure 4:
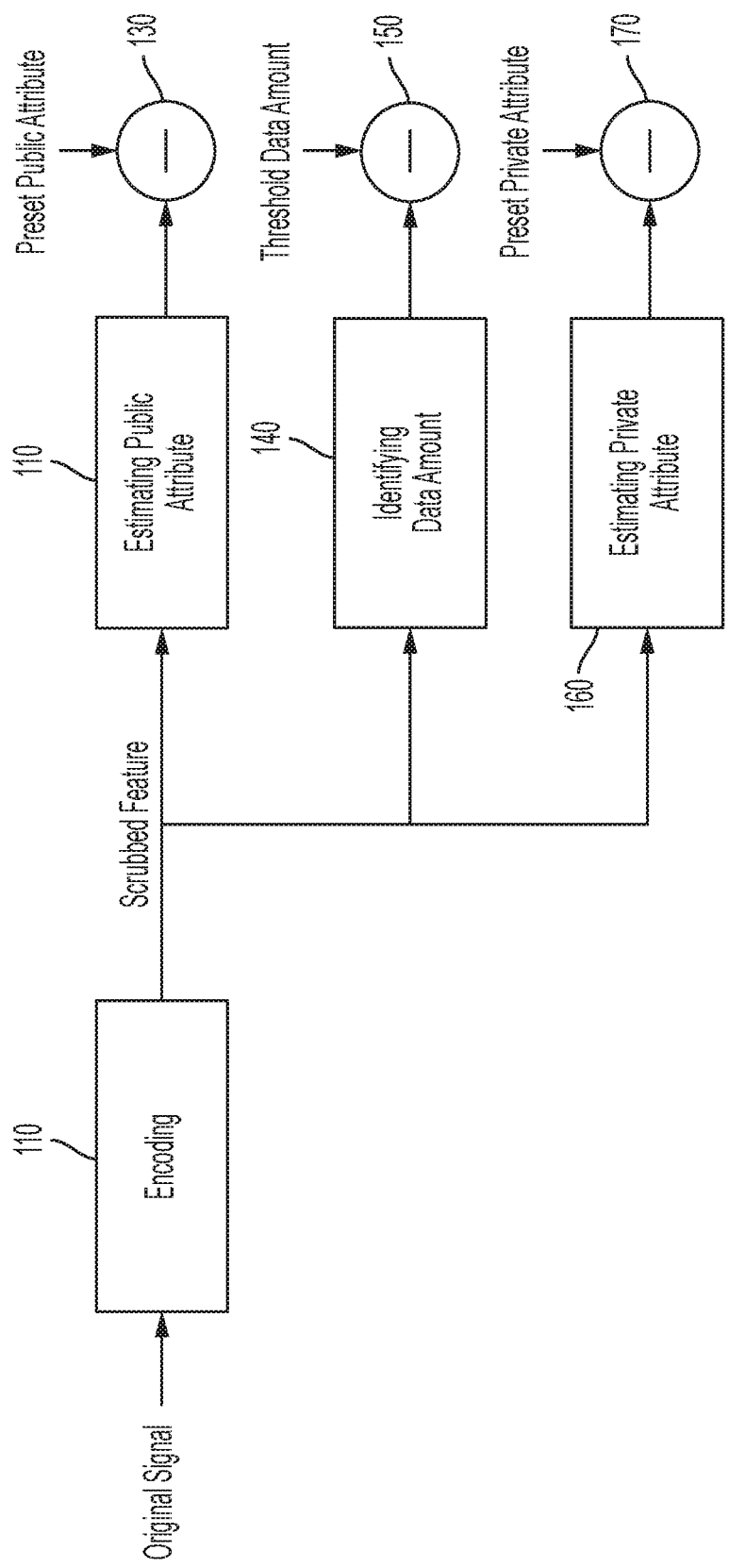
FIG. 4 is a diagram for describing a data anonymizing process according to embodiments.

FIG. 4 is a diagram for describing a data anonymizing process according to embodiments.

As shown in FIG. 4, an encoding process 110 is performed on an original signal to obtain a scrubbed feature, based on a preset public attribute and a preset private attribute. For example, when the original signal is a user's facial image, the public attribute is set to an emotion of the user (e.g., whether the user is smiling or not), and the private attribute may be set to a gender of the user. However, examples of the private attribute are not limited to a user's gender, and may include any one or any combination of a user's gender, emotion, identification, age, body gesture, hand gesture, body pose, gaze direction, finger direction, clothes, accessories; and etc. The preset public attribute(s) and preset private attribute(s) may be used as labels in computing neural network losses.

The original signal may be scrubbed through the encoding process 110 so that the scrubbed feature contains information of the public attribute while the private attribute is removed and an amount of the data about the original signal is minimized.

A public attribute estimating process 120 is performed on the scrubbed feature to estimate the public attribute from the scrubbed feature.

A first comparison process 130 is performed on the estimated public attribute in comparison with the preset public attribute. In the first comparison process 130, a difference between the estimated public attribute and the preset public attribute is calculated, as a first loss.

A data amount identifying process 140 is performed to identify an amount of data in the scrubbed feature about the original signal. The less amount of data the scrubbed feature contains about the original signal, the higher privacy protection and data anonymization are achieved.

A second comparison process 150 is performed on the identified amount of data about the original signal in the scrubbed feature in comparison with a threshold data amount. In the second comparison process 130, a difference between the identified amount of data about the original signal and the threshold data amount, is calculated, as a second loss. When the threshold data amount is set to zero, the second comparison process 150 may be omitted and the output from the identifying process 140 may be used as the second loss.

A private attribute extracting process 160 is performed on the scrubbed feature to extract the private attribute from the scrubbed feature, as an estimated private attribute.

A third comparison process 170 is performed on the estimated private attribute in comparison with the preset private attribute. In the third comparison process 170, a difference between the estimated private attribute and the preset private attribute is calculated, as a third loss.

The encoding process 110, the public attribute estimating process 120, the identifying process 140 for identifying the data amount in the scrubbed feature about the original signal may be updated based on the first loss and the second loss at a first phase, and the private attribute estimating process 160 may be updated based on the third loss at a second phase while the update of the encoding process 110, the public attribute estimating process 120, and the identifying process 140 does not occur.

In accordance with embodiments of the present disclosure, the data anonymizing process enables a public attribute to be transmitted out to a third party while removing the given private attribute and reducing an amount of any other information (i.e., non-public attributes or undefined private attributes) by converting the original signal to the scrubbed feature.

Figure 5:
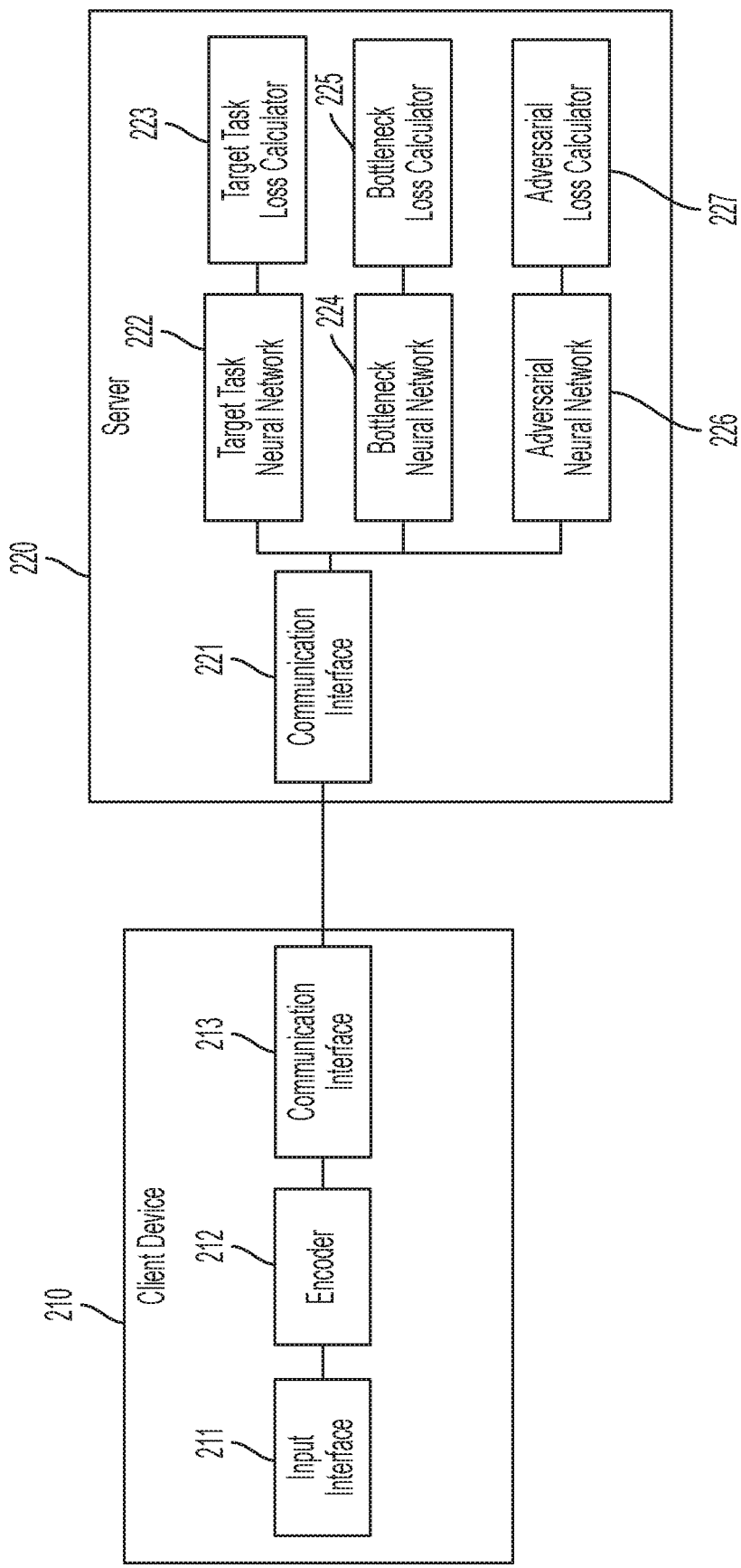
FIG. 5 is a block diagram of a configuration of an image anonymizing system according to embodiments.

FIG. 5 is a block diagram of a configuration of an image anonymizing system according to embodiments.

As shown in FIG. 5, the image anonymizing system includes a client device 210 and a server 220.

The client device 210 may be implemented as a television, a smartphone, a laptop, a desktop, or the like. The server 200 may be implemented as, for example, a cloud server running in a cloud computing environment. The server 200 may be a content provider server, an application server, or a video streaming service server.

The client device 210 may include an input interface 211, an encoder 212, and a communication interface 213. The input interface 211 may include a camera, a microphone, a keyboard, and/or a touchpad to receive an input signal. For example, the input interface 211 may capture an image of a user of the client device 210 using the camera and provide the captured image to the encoder 212 as an original signal.

The encoder 212 may convert the original signal to a scrubbed feature based on a preset public attribute and a preset private attribute. For example, the original signal may be a facial image of a user of the client 210, the preset public attribute is an attribute related to an emotion of the user (e.g., whether the user is smiling or not), the preset private attribute is an attribute related to a gender of the user.

The encoder 212 may include an encoder neural network including an input layer, one or more hidden layers, and an output layer, and may process the original signal through the encoder neural network to obtain the scrubbed feature by preserving the public attribute while removing the private attribute and reducing an amount of data about the original signal. The data in the scrubbed feature about the original signal may be considered as including the data about non-public attributes or undefined private attributes.

The communication interface 213 may establish a connection between the client device 210 and the server 220. The connection may be a wireless communication or a wired communication. The communication interface 213 may transmit the scrubbed feature to the server 220.

The server 200 may include a communication interface 221, a target task neural network 222, a target task loss calculator 223, a bottleneck neural network 224, a bottleneck loss calculator 225, an adversarial neural network 226, and a privacy task loss calculator 227.

The communication interface 221 may receive the scrubbed feature from the client device 210, and may transmit the scrubbed feature to the target task neural network 224, the bottleneck neural network 224, and the adversarial neural network 226.

The target task neural network 222 may perform the public attribute estimating process 120 on the scrubbed feature to extract a public attribute from the scrubbed feature, as an estimated public attribute.

The target task loss calculator 223 may perform the first comparison process 130 on the extracted public attribute to compare the estimated public attribute with the preset public attribute. In particular, the target task loss calculator 223 may calculates a difference between the estimated public attribute and the preset public attribute label, as a target task loss. The target task loss may be referred to as error metrics of the target task neural network 222.

The bottleneck neural network 224 may perform the data amount identifying process 140. Specifically, the bottleneck neural network 224 may estimate or identify the amount of data in the scrubbed feature about the original signal. The less amount of data the scrubbed feature contains about the original signal, the higher privacy protection and data anonymization may be achieved. The bottleneck neural network 224 may presume that the data in the scrubbed feature about the original signal contains data about non-public attributes or undefined private attributes.

The bottleneck loss calculator 225 may perform the second comparison process 150 on the identified amount of data in the scrubbed feature about the original signal in comparison with a threshold data amount (e.g., zero). Specifically, the bottleneck loss calculator 225 may calculate a difference between the identified amount of data and the threshold data amount as a bottleneck loss. For example, the threshold data amount may be set to zero so that the bottleneck loss represents the identified amount of data in the scrubbed feature about the original signal. In that case, the bottleneck loss calculator 225 may be omitted and the output of the bottleneck neural network 224 may be used as the bottleneck loss.

The adversarial neural network 226 may perform the private attribute estimating process 160 on the scrubbed feature. Specifically, the adversarial neural network 226 may extract the private attribute from the scrubbed feature, as an estimated private attribute, so as to allow the image anonymizing system to evaluate the robustness of the encoder 212 against an adversary party.

The privacy task loss calculator 227 may perform the third comparison process 170 on the estimated private attribute in comparison with the preset private attribute. In particular, the privacy task loss calculator 227 may calculate a difference between the estimated private attribute and the preset private attribute, as a privacy task loss.

The target task loss and the bottleneck loss may be back propagated to the encoder neural network 310 of the encoder 212, the target task neural network 222, the bottleneck neural network 224 at a first step, and the privacy task loss may be back propagated to the adversarial neural network 226 at a second step, to perform two-step joint training. Specifically, at the first step, the neural networks 310, 222, and 224 may be jointly trained while the adversarial neural network 226 is fixed, to minimize a sum of the target task loss and the bottleneck loss minus the privacy task loss, and at the second step, the adversarial neural network 226 may be trained while the neural network of encoder 212 and the neural networks 222 and 224 are fixed, to minimize the privacy task loss. The process is repeated iteratively until convergence, or, for example, the sum of the target task loss and the bottleneck loss minus the privacy task loss at the first step and the privacy task loss at the second step drop below corresponding predetermined thresholds.

In FIG. 5, the encoder 212 is illustrated as being disposed in the client device 210 separately from the target task neural network 222, the target task loss calculator 223, the bottleneck neural network 224, the bottleneck loss calculator 225, the adversarial neural network 226, and the privacy task loss calculator 227 that are located in the server 220, but the embodiments are not limited thereto, and the encoder 212, the target task neural network 222, the target task loss calculator 223, the bottleneck neural network 224, the bottleneck loss calculator 225, the adversarial neural network 226, and the privacy task loss calculator 227 may be trained in one processor, or one computer system including a plurality of processors.

Figure 6:
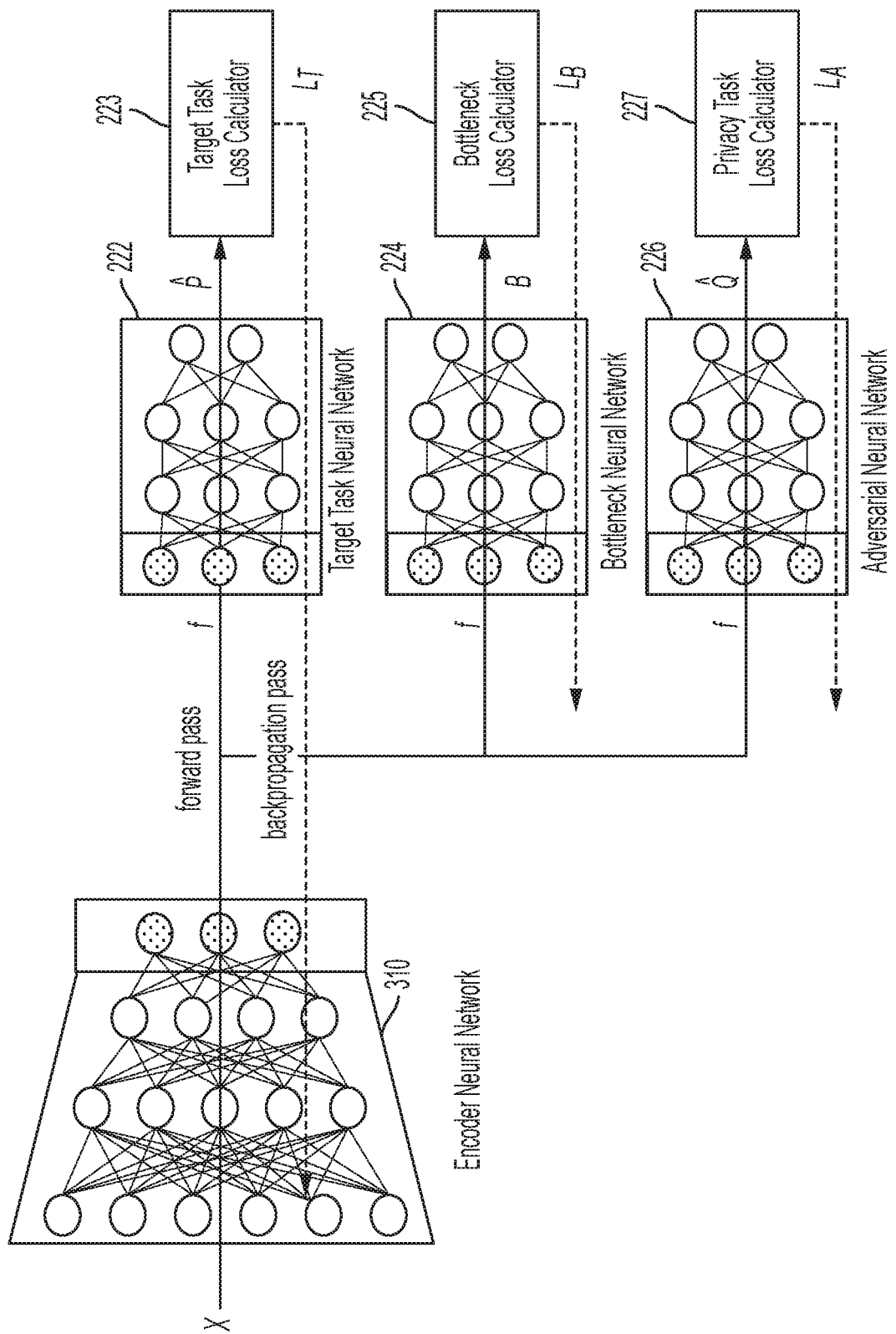
FIG. 6 is a diagram for describing a method of training an encoder neural network, a target task neural network, a bottleneck neural network, and an adversarial neural network according to embodiments.

FIG. 6 is a diagram for describing a method of training an encoder neural network, a target task neural network, a bottleneck neural network, and an adversarial neural network according to embodiments.

As shown in FIG. 6, an encoder neural network 310, a target task neural network 222, a target task loss calculator 223, a bottleneck neural network 224, a bottleneck loss calculator 225, an adversarial neural network 226, and a privacy task loss calculator 227 are provided to anonymize data by removing a private attribute while preserving a public attribute of the data.

The encoder neural network 310 may have an input layer, one or more hidden layers, and an output layer. The input layer may accept an input signal X including at least one of an image, a voice, and text. For example, the input signal X may be obtained from a camera, a microphone, a keyboard, a touchscreen, and an external device, or may be retrieved from a local storage. The encoder neural network 310 may process the input signal X through the hidden layers to convert the input signal X to a scrubbed feature f based on a preset public attribute P and a preset private attribute Q. The scrubbed feature f is output from the output layer of the encoder neural network 310. The scrubbed feature f may contain data from which the public attribute P of the input signal X can be estimated using another neural network, and in which the private attribute Q is removed, altered, or encrypted.

For example, the input signal X may be an original image of one or more users, the public attribute P may be at least one of a number of heads, head orientations, and facial expression of the one or more users in the image, and the private attribute Q may include an identification and a gender. However, examples of the input signal X the public attribute P, and the private attribute Q are not limited thereto. The public attribute P and the private attribute Q may be predetermined, or may be selected by an operator or a user.

The encoder neural network 310 may compute the scrubbed feature f (i.e., f=E(X)) to provide information about the public attribute P but minimize information about the input signal X, and remove or distort the private attribute Q. For example, when the public attribute P is a feature indicating whether the user is smiling or not, the non-public attributes are all the attributes of the input signal X, except for the public attribute P indicating whether the user is smiling or not.

The target task neural network 222 may include an input layer, one or more hidden layers, and an output layer. The input layer may receive the scrubbed feature f that is output from the encoder neural network 310. The target task neural network 222 may process the scrubbed feature f through the hidden layers to extract the public attribute P as an estimated public attribute $\hat{P}$. The output layer may output the estimated public attribute $\hat{P}$, which may be represented as a softmax response over the public attribute $\hat{P}$.

The target task loss calculator 223 may calculate a target task loss $L_T$ that represents the system's performance on inferring the public attribute P from the scrubbed feature f. When the public attribute P is a discrete attribute, the target task loss calculator 223 calculates a cross-entropy loss as the target task loss $L_T$.

The bottleneck neural network 224 may include an input layer, one or more hidden layers, and an output layer. The input layer of the bottleneck neural network 224 may receive the scrubbed feature f. In the forward pass, the bottleneck neural network 224 may process the scrubbed feature f through the hidden layers to estimate an amount B of information in the scrubbed feature f about the input signal X.

The bottleneck neural network 224 may cause the encoder neural network 310 to minimize the amount B of information about the input signal X, given that the encoder neural network 310 needs to provide information about the public attribute P. For example, the bottleneck neural network 224 may cause the encoder neural network 310 to minimize the amount B based on one of the following methods: a clustering method in which the bottleneck neural network 224 causes the encoder neural network 310 to cluster a scrubbed feature when discrete public attributes are provided; a sparsity method in which the bottleneck neural network 224 causes the encoder neural network 310 to generate a sparse scrubbed feature, and a sparsity plus coring method in which the bottleneck neural network 224 causes the encoder neural network 310 to generate a scrubbed feature having minimum mutual information of private attributes.

The bottleneck loss calculator 225 may calculate a bottleneck loss $L_B$ that represents the amount B of information in the scrubbed feature f about the input signal X. The bottleneck loss $L_B$ may increase in proportion to the amount B.

The adversarial neural network 226 may include an input layer, one or more hidden layers, and an output layer. The adversarial neural network 226 may accept the scrubbed feature f as input and may output an estimated private attribute $\hat{Q}$. The image anonymization system may use the adversarial neural network 226 to model the adversary's capability of extracting the private attribute Q from the scrubbed feature f.

The privacy task loss calculator 227 may calculate a privacy task loss $L_A$ that represents an estimation of the advisory's capability of inferring the private attribute Q from the scrubbed feature f.

In a training phase, the image anonymization system may perform a two-step process at each iteration. The first step is to train the encoder neural network 310, the target task neural network 222, the bottleneck neural network 224 to minimize the following loss, with the adversarial neural network 226 being fixed:

$$\min_{E,T,B} L_T + \alpha L_B - \beta L_A,$$

wherein E denotes the encoder neural network 310, T denotes the target task neural network 222, B denotes bottleneck neural network 224, and α and β are weighting factors.

In the second step, the adversarial neural network 226 is trained to minimize the following loss, with the encoder neural network 310, the target task neural network 222, the bottleneck neural network 224 being fixed:

$$\min_{A} L_A$$

The input layer of the adversarial neural network 226 may receive the scrubbed feature f. In the forward pass, the adversarial neural network 226 may process the scrubbed feature f through the hidden layers to estimate the private attribute Q from the scrubbed feature f.

During the training phase, the encoder neural network 310 may be positioned on a client side, and the target task neural network 222, the bottleneck neural network 224, the adversarial neural network 226, the target task loss calculator 223, the bottleneck loss calculator 225, and the privacy task loss calculator 227 may be positioned on a server side, but embodiments are not limited thereto. In another example, the encoder neural network 310, the target task neural network 222, the bottleneck neural network 224, the adversarial neural network 226, the target task loss calculator 223, the bottleneck loss calculator 225, and the privacy task loss calculator 227 may be trained in the same computing system including one or more processors and one or ore storages.

Figure 7:
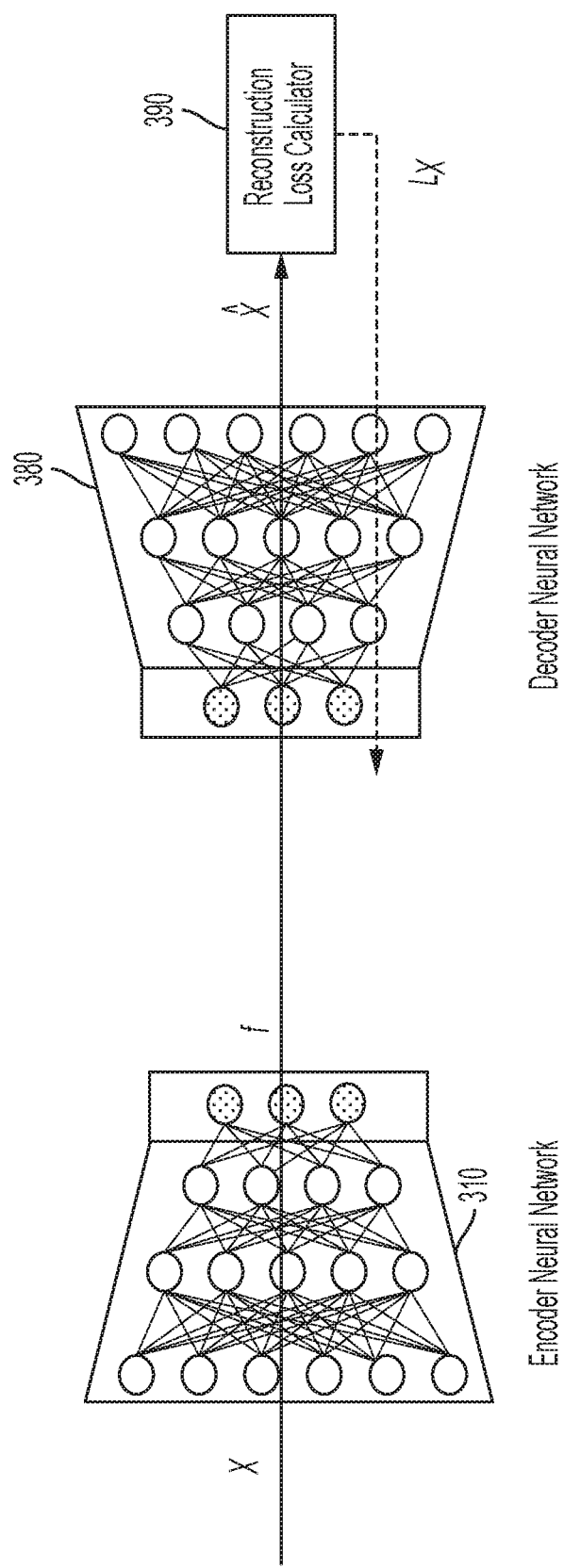
FIG. 7 illustrates a decoder neural network according to embodiments.

FIG. 7 illustrates a decoder neural network in accordance with embodiments of the present disclosure.

As shown in FIG. 7, the image anonymization system may include an encoder neural network 310, a decoder neural network 380, a reconstruction loss calculator 390. For example, the decoder neural network 380 and the reconstruction loss calculator 390 may be added to the server 220 in FIGS. 2 and 5. In that case, the decoder neural network 380 and the reconstruction loss calculator 390 may be connected in parallel with the target take neural network 222 and the target task loss calculator 233, and also in parallel with the bottleneck neural network 224 and the bottleneck loss calculator 225. The decoder neural network 380 and the reconstruction loss calculator 390 may be included in the same device (e.g., a client device) as the encoder neural network 310, or may be included in a different device (e.g., a server) from the device (e.g., a client device) that includes the encoder neural network 310.

The decoder neural network 380 may accept the scrubbed feature f as input and may generate a reconstructed signal $\hat{X}$ from the scrubbed feature f. The reconstruction loss calculator 28 may calculate, based on the scrubbed feature f, a reconstruction loss $L_X$ that represents an estimation of the advisory's capability of reconstructing the input signal X from the scrubbed feature f. The image anonymization system may train the decoder neural network 380 to minimize the following loss:

$$\min_{D} L_X,$$

wherein D denotes the decoder neural network 380.

In a case in which the decoder neural network 380 and the reconstruction loss calculator 390 are added to the system illustrated in FIGS. 1-6, the decoder neural network 380 is trained to minimize the reconstruction loss $L_X$ after training of the target task neural network 222, the bottleneck neural network 224, and the adversarial neural network 226 is completed, or while the target task neural network 222, the bottleneck neural network 224, and the adversarial neural network 226 are fixed and are not being trained. In other words, the decoder neural network 380 may be trained separately from training of the encoder neural network 310, the target task neural network 222, the bottleneck neural network 224, and the adversarial neural network 226.

Figure 8:
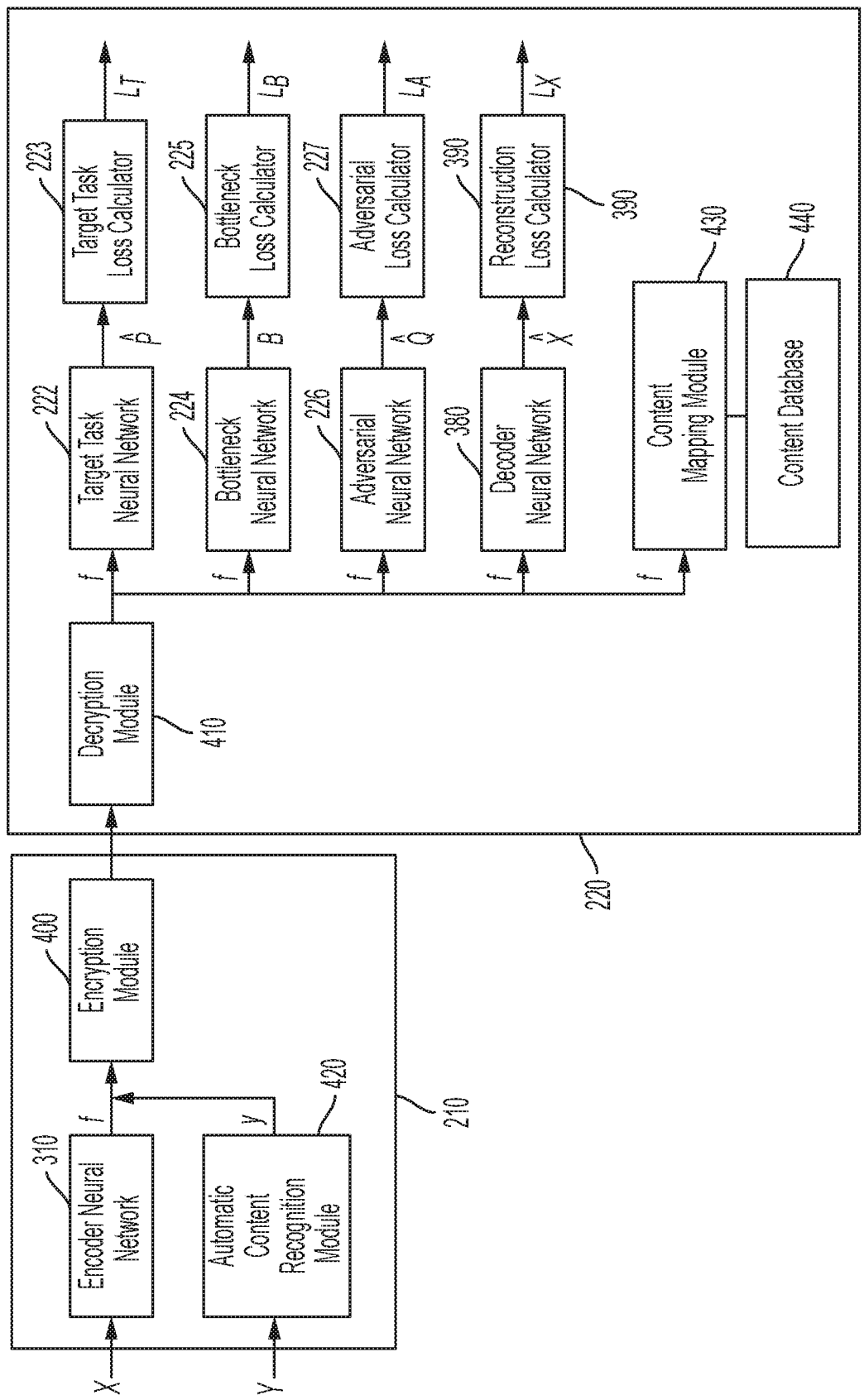
FIG. 8 illustrates an encryption module, a decryption module, and automatic content recognition module, according to embodiments.

FIG. 8 illustrates an encryption module and a decryption module in accordance with embodiments of the present disclosure.

As shown in FIG. 8, an encryption module 400 and a decryption module 410 may be disposed in a client device 210 and a server 220, respectively, to provide an additional security of data transmission. Specifically, the encryption module 400 and the decryption module 410 may be placed between an output layer of an encoder neural network 310, and an input layer of each of a target task neural network 222, a bottleneck neural network 224, an adversarial neural network 226, and a decoder neural network 380.

The encryption module 310 may accept the scrubbed feature f as input, and may encrypt the scrubbed feature f with an encryption algorithm and an encryption key. The decryption module 120 may receive the encrypted scrubbed feature f, and decrypt the encrypted scrubbed feature f with a decryption algorithm and a decryption key. The encrypted scrubbed feature f may be provided to the target task neural network 222, the bottleneck neural network 224, the adversarial neural network 226, and the decoder neural network 380. Examples of the encryption/decryption algorithm may include a Data Encryption Standard (DES) algorithm, a Triple DES algorithm, a public-key encryption algorithm, such as Rivest-Shamir-Adleman, a Blowfish algorithm, and an Advanced Encryption Standard (AES).

An encoder neural network 310, a target task neural network 222, a bottleneck neural network 224, an adversarial neural network 226, and a decoder neural network 380 in FIG. 8 may operate in a manner similar to those illustrated in FIGS. 1-7.

The client device 210 may further include an automatic content recognition (ACR) module 420, and the server 220 may further include a content mapping module 240 and a content database 440.

The ACR module 420 may receive content Y which is provided to a user while an image of the user is captured. The ACR module 420 may generate a time stamp indicating the time t at which the content Y is presented to the user and/or received by the ACR module 420. For example, the content Y is a video displayed on the client device (e.g., a television or a smartphone) 210 at time t, and the user's image is captured by a camera of the client device 210, at the same time t, while the user is watching the video (i.e., the content Y).

The ACR module 420 may extract a content fingerprint y from the content Y. For example, the ACR module 420 may perform a video fingerprinting on the content Y to extract at least one of a motion direction, a pixel intensity, a color histogram, an arrangement of object inside frames, and an order of frames from the content Y as the content fingerprint y. Once the content fingerprint y is extracted, the ACR module 420 may transmit the content fingerprint y and the time stamp to the encryption module 400.

The encryption module 400 may receive the scrubbed feature f from the encoder neural network 310, and may receive the content fingerprint y and the time stamp from the ACR module 420. The encryption module 400 may encrypt the scrubbed feature f, the content fingerprint y, and the time stamp. The encrypted scrubbed feature f, content fingerprint y, and time stamp may be transmitted to the decryption module 410. The decryption module 120 may decrypt the encrypted scrubbed feature f and provide the decrypted scrubbed feature f to the target task neural network 222, the bottleneck neural network 224, the adversarial neural network 226, and the decoder neural network 380, and the content mapping module 430.

The target task neural network 222 may extract the public attribute P from the input signal X as described with reference to FIGS. 1-6, and may also identify the time t at which the input signal X is obtained, by using the time stamp.

The content mapping module 430 may look up a content identification (ID) corresponding to the content fingerprint y in the content database 440, and may map the content ID to the public attribute P based on the time t. For example, the content ID may represent an ID assigned to a content category (e.g., sports videos, news videos, movies, etc.); and the public attribute P may indicate an emotion associated with a smile. In that case, the content mapping module 150 may map the content ID to an emotion denoting pleasure, happiness, or joy, so as to provide analytic information that the user likes videos having a category of the content ID.

Figure 9:
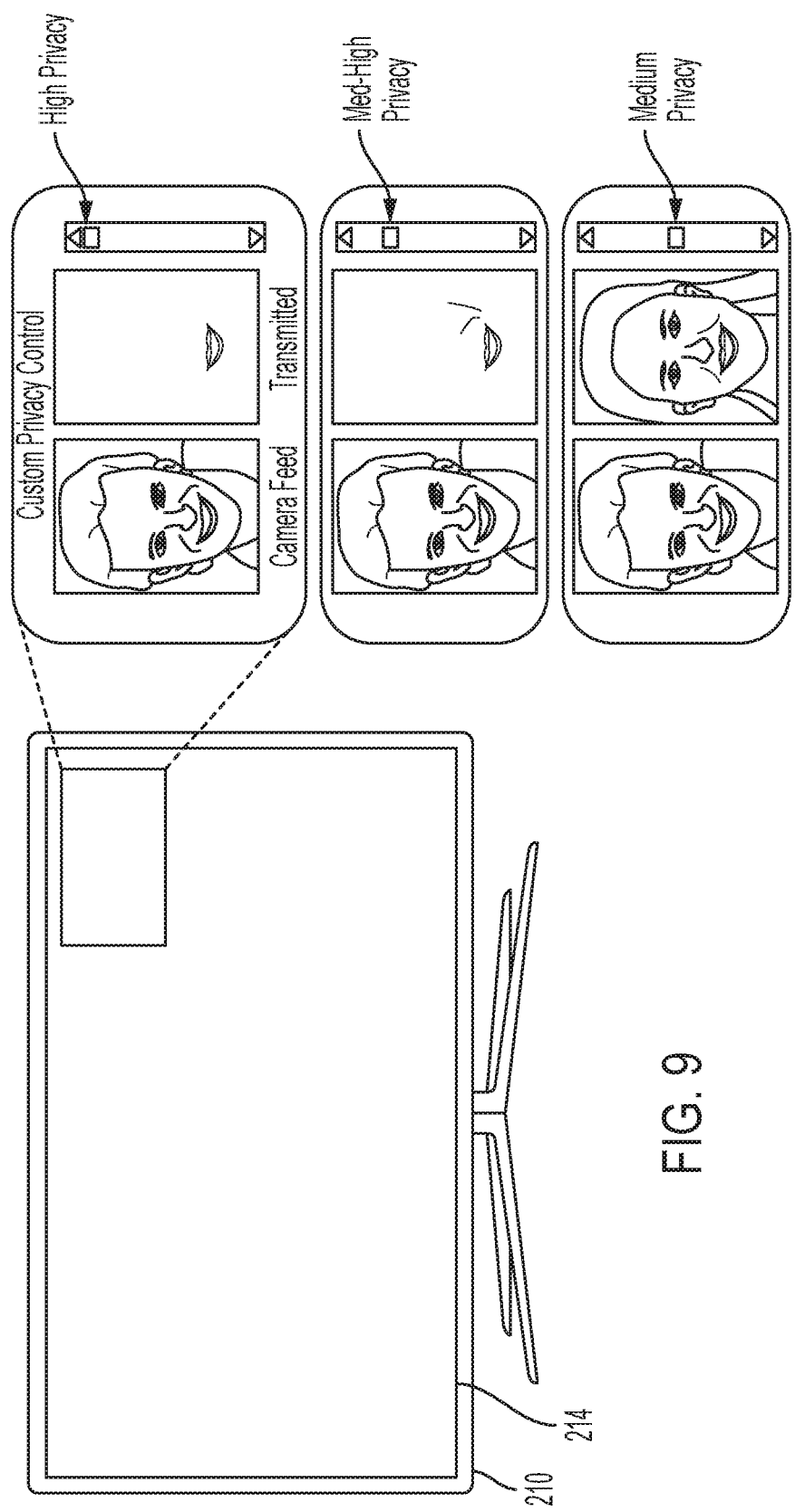
FIG. 9 illustrates a user interface according to embodiments.

FIG. 9 illustrates a client device providing a user interface in accordance with embodiments of the present disclosure.

As shown in FIG. 9, a client device 210 may include a display 214 that provides a user interface to allow a user to set a privacy level. For example, the user interface allows the user to move a scroll bar position to set the privacy level to a high privacy, a medium-high privacy, or a medium privacy. The display 214 may display a reconstructed image corresponding to the privacy level set by the user, so that the user can recognize a degree of privacy that changes according to the different privacy settings.

Figure 10:
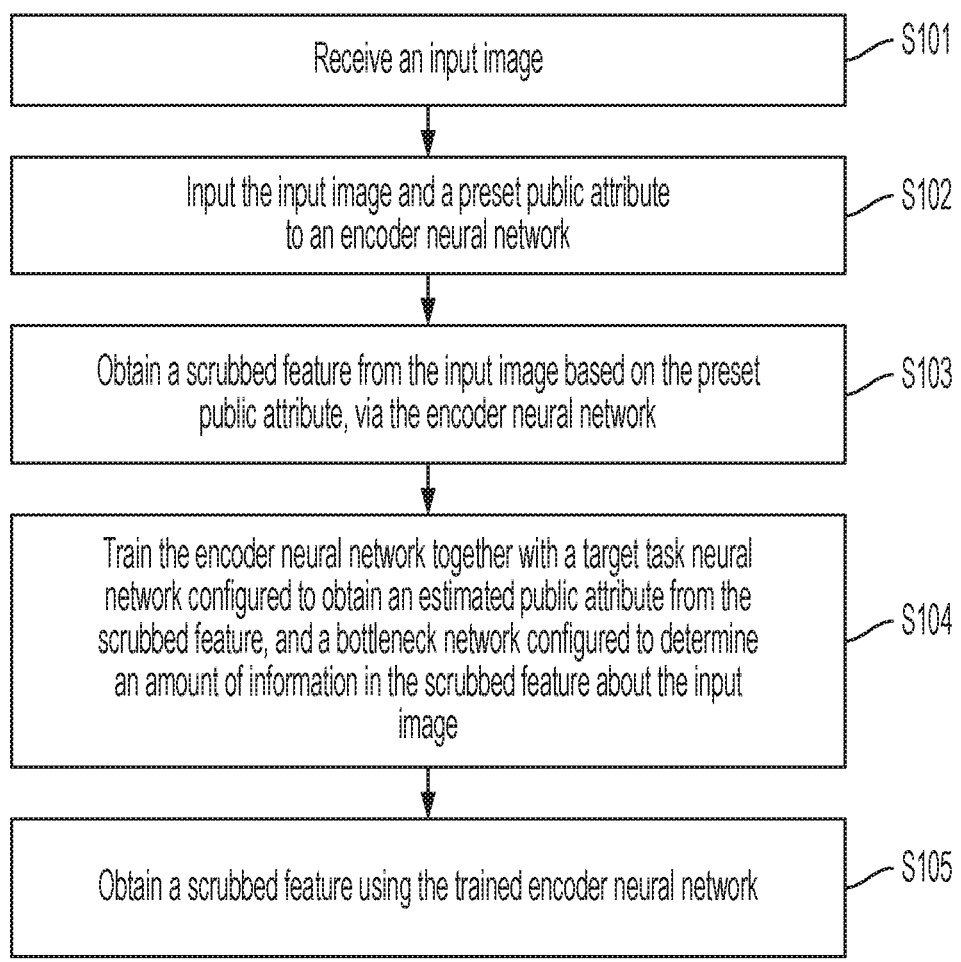
FIG. 10 is a flowchart illustrating an image anonymization method of a client device according to embodiments.

FIG. 10 is a flowchart illustrating an image anonymization method of a client device according to embodiments.

As shown in FIG. 10, a client device 210 may receive an input image X in operation S101, and may input the input image and a preset public attribute P to an encoder neural network 310, in operation S102.

The encoder neural network 310 may obtain a scrubbed feature f from the input image X based on the preset public attribute P, in operation S103. The encoder neural network 310 may obtain the scrubbed feature f from the input image X without inputting a preset private attribute Q, or alternatively, may obtain the scrubbed feature based on both the preset public attribute P and the preset private attribute Q.

In operation S104, the client device 210 may train the encoder neural network 310 jointly with a target task neural network 320 configured to obtain an estimated public attribute $\hat{P}$ from the scrubbed feature, and a bottleneck neural network 340 configured to determine an amount B of information in the scrubbed feature f about the input image X. The target task neural network 320 and the bottleneck neural network 224 may be included in a server 220, but during a training process, the encoder neural network 310, the target task neural network 320, and the bottleneck neural network 340 may be run in the same computer system, including one or more processors and one or more storages.

The encoder neural network 310 is trained to minimize a sum of a difference between the estimated public attribute $\hat{P}$ and the preset public attribute P, and the amount B of information in the scrubbed feature f about the input image x.

The encoder neural network 310 may be determined to be trained to minimize the sum of the difference between the estimated public attribute and the preset public attribute, and the amount of information in the scrubbed feature about the input image, when the sum becomes less than a predetermined threshold value.

In embodiments of the disclosure, the client device 210 may further include a decoder neural network 380 to generate a reconstructed image $\hat{X}$ of the input image X from the scrubbed feature f, and to display the reconstructed image $\hat{X}$ on a display 214, In this case, the decoder neural network 380 may be trained separately from the training of the encoder neural network 310, the target task neural network 320, and the bottleneck neural network 340.

In another embodiment, the decoder neural network 380 may be placed in the server 220, and the client device 210 may receive the reconstructed image $\hat{X}$ from the server 200 via the communication interfaces 213 and 221.

In operation S105, when the training is completed, the client device 210 may obtain a scrubbed feature f from another input image using the trained encoder neural network 310.

Figure 11:
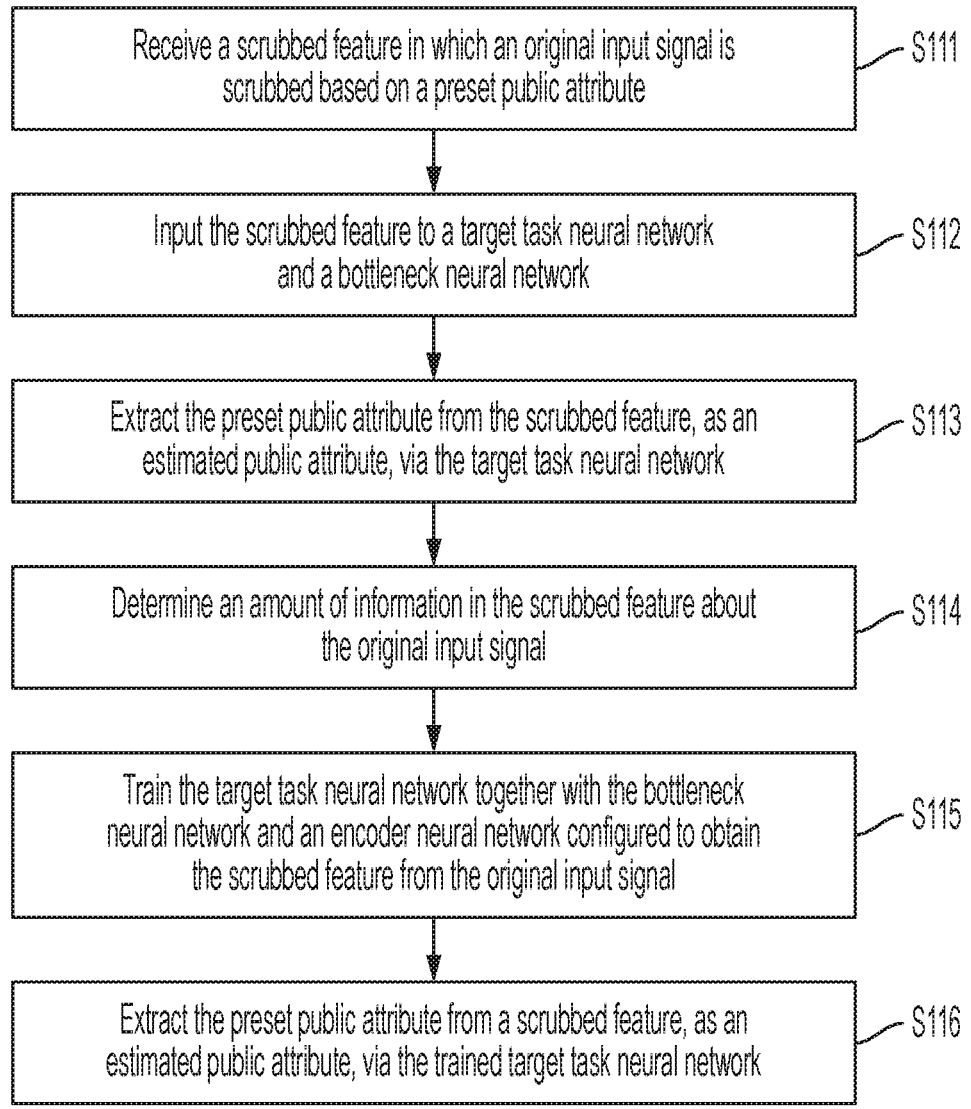
FIG. 11 is a flowchart illustrating an image anonymization method of a server according to embodiments.

FIG. 11 is a flowchart illustrating an image anonymization method of a server according to embodiments.

As shown in FIG. 11, a server 220 may receive, from a client device 210, a scrubbed feature fin which an original input signal X is scrubbed based on a preset public attribute P, in operation S111.

The server 220 may input the scrubbed feature f to a target task neural network 222 and a bottleneck neural network 330, in operation S112.

The target task neural network 222 may extract the preset public attribute from the scrubbed feature f, as an estimated public attribute $\hat{P}$, in operation S113.

The bottleneck neural network 224 may determine an amount B of information in the scrubbed feature f about the input image X, in operation S114.

The server 200 may train the target task neural network 222 jointly with the bottleneck neural network 224 and the encoder neural network 310 configured to obtain the scrubbed feature f from the original input signal X, in operation 3115.

In embodiments of the disclosure, the encoder neural network 310 is included in the client device 210 while the target task neural network 222 and the bottleneck neural network 330 are placed in the server 220, but during a training process, the encoder neural network 310, the target task neural network 222, and the bottleneck neural network 340 may be run in the same computer system, including one or more processors and one or more storages.

In operation S116, the server 220 may estimate the public feature P using the trained target task neural network 222.

Once the training is completed, the server 200 may not operate the bottleneck neural network 224.

In embodiments of the disclosure, the server 220 may further include an adversarial neural network 226 configured to generate an estimated private attribute $\hat{Q}$ from the scrubbed feature f. In that case, the encoder neural network 310, the target task neural network 320, and the bottleneck neural network 340 may be jointly trained based on the target task loss $L_T$, the bottleneck loss $L_B$, and the privacy task loss $L_A$. The adversarial neural network 226 may be trained based on the privacy task loss $L_A$, separately from the encoder neural network 310, the target task neural network 320, and the bottleneck neural network 340 while the encoder neural network 310, the target task neural network 320, and the bottleneck neural network 340 are fixed.

The server 220 may further a decoder neural network 380 configured to generate a reconstructed image $\hat{X}$ of the original input image X from the scrubbed feature f, and may transmit the reconstructed image $\hat{X}$ to the client device 210. The decoder neural network 380 is trained to minimize a difference between the reconstructed image $\hat{X}$ and the original input image X. The decoder neural network 380 may be trained after the training of the encoder neural network 310, the target task neural network 320, and the bottleneck neural network 340 is complete, or while the encoder neural network 310, the target task neural network 320, and the bottleneck neural network 340 are fixed.

Figure 12:
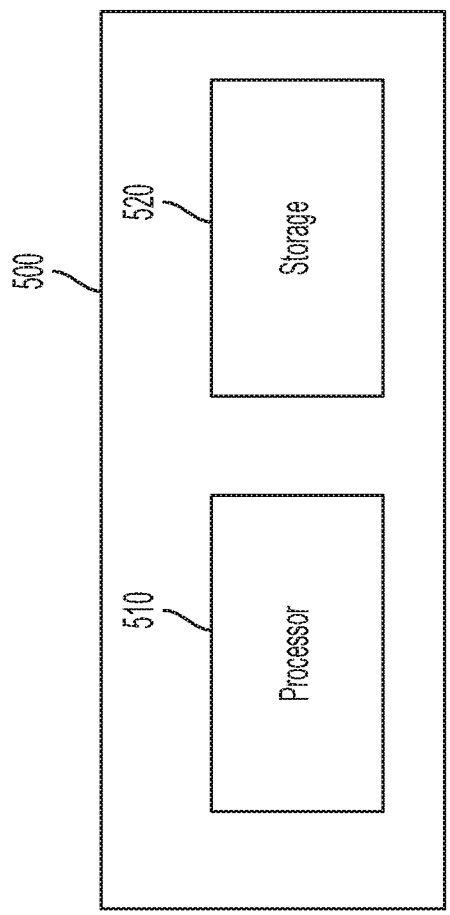
FIG. 12 is a block diagram illustrating a configuration of a client device according to embodiments.

FIG. 12 is a block diagram illustrating a configuration of a client device according to embodiments of the disclosure.

As shown in FIG. 12, a client device 500 may include a processor 510 and a storage 520.

The processor 510 may perform overall control of the client device 500, and may execute one or more programs stored in the storage 520. The processor 510 is implemented in hardware, firmware, or a combination of hardware and software. The processor 510 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 510 includes one or more processors capable of being programmed to perform a function.

The processor 510 according to embodiments of the disclosure may perform any one or any combination of operations of the encoder 212 and the encoder neural network 310 which are described with reference to FIGS. 5-8, operations of the decoder neural network 280 and the reconstruction loss calculator 390 which are described with reference to FIG. 7, operations of the encryption module 400 and the ACR module 420 which are described with reference to FIG. 8, and operations of the user interface illustrated in FIG. 9.

The storage 520 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The storage 520 may also include a random access memory (RAM), a read only memory (ROM), and/or another type of dynamic or static storage device (e.g., a flash memory, a magnetic memory, and/or an optical memory).

The storage 520 may store various data, programs, or applications for driving and controlling the client device 210. A program stored in the memory 520 may include one or more instructions. A program including one or more instructions or an application stored in the memory 520 may be executed by the processor 510.

Figure 13:
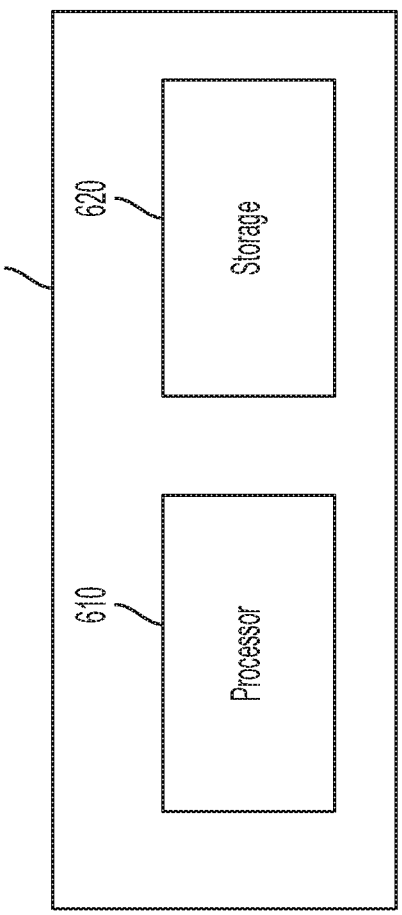
FIG. 13 is a block diagram illustrating a configuration of a server according to embodiments of the disclosure.

FIG. 13 is a block diagram illustrating a configuration of a server according to embodiments of the disclosure.

With reference to FIG. 13, a server 600 may include a processor 610 and a memory 620.

The processor 610 may perform overall control of the client device 600, and may execute one or more programs stored in the storage 620. The processor 510 is implemented in hardware, firmware, or a combination of hardware and software. The processor 610 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 610 includes one or more processors capable of being programmed to perform a function.

The processor 610 according to embodiments of the disclosure may perform any one or any combination of operations of the target task neural network 222, the target task loss calculator 233, the bottleneck neural network 244, the bottleneck loss calculator 225, the adversarial neural network 266, the privacy task loss calculator 227, the decoder neural network 380, the reconstruction loss calculator 390, and the content mapping module 430, which are described with reference to FIGS. 5-8.

The storage 620 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The storage 620 may also include a random access memory (RAM), a read only memory (ROM), and/or another type of dynamic or static storage device (e.g., a flash memory, a magnetic memory, and/or an optical memory).

Figure 14:
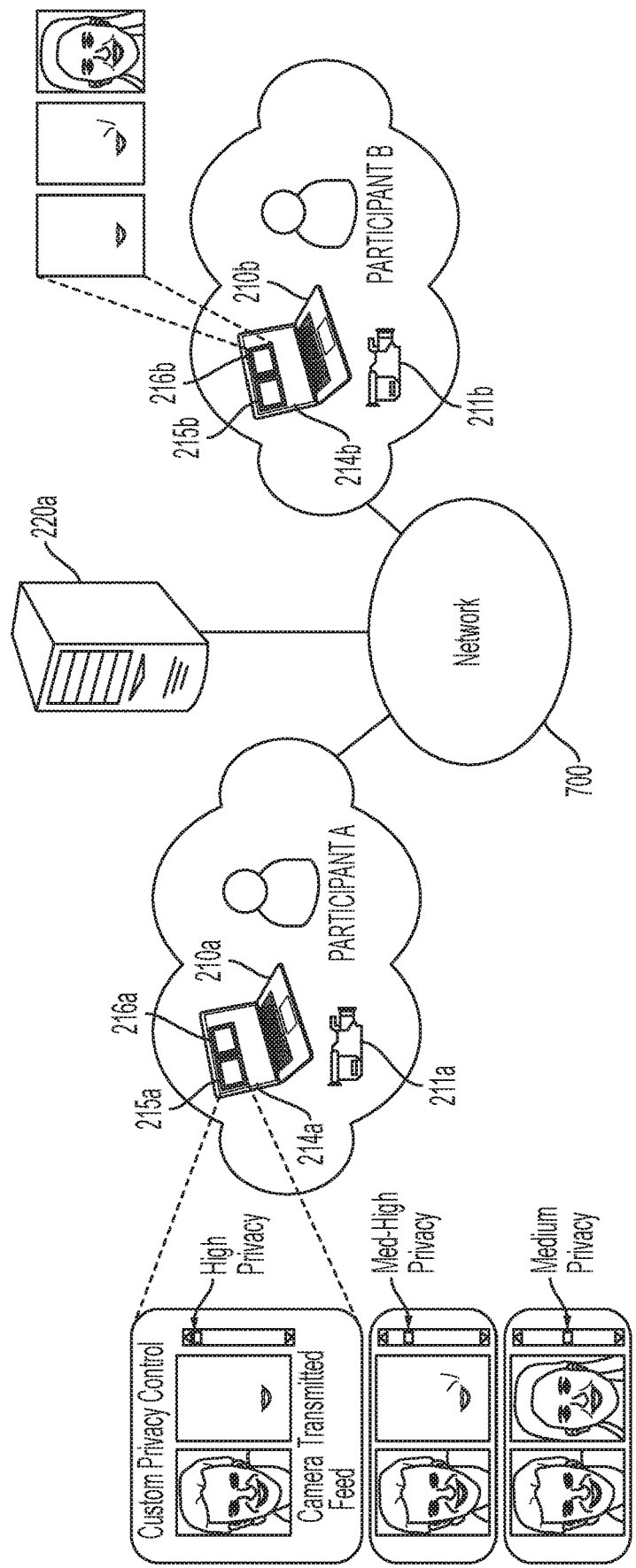
FIG. 14 illustrates privacy controls when user is sharing scrubbed video, illustrated with a video conferencing system, according to embodiments of the disclosure.

FIG. 14 illustrates a video conferencing system according to embodiments of the disclosure. The sharing of scrubbed video content is similar for other applications for which the user's scrubbed video is transmitted to an external network.

As shown in FIG. 14, the video conferencing system includes more than one client devices, such a first client device 210a and a second client device 210b, and at least one server 220a, and a network 700 that connects the client devices 210a, 210b, and the server 220a.

The network 700 may provide a communication link between the first client device 210a and the second client device 210b, and also between the server 220a and each of the first client device 210a and the second client device 210b. The network 700 may be implemented as a local area network (LAN a wireless local area networks (WLAN), a wide area network (WAN), a wireless wide area network (WWAN), a wireless personal area network (WPAN), a Wi-Fi network, and/or a cellular network.

The first and the second client devices 210a and 210b may be personal computers (PCs), laptops, smartphones, personal digital assistants (PDAs), cellular telephones, and/or other devices with processing capability. The first and the second client devices 210a and 210b may have substantially the same structure of the client device 210 illustrated in FIG. 2. 5, or 8 and may perform substantially the same operations as the client device 210 illustrated in FIG. 2. 5, or 8.

The first client device 210a and the second client device 210b may be respectively connected to a first camera 211a and a second camera 211b, via wired or wireless connection. Alternatively, the first camera 211 and the second camera 211b may be mounted or included in the first client devices 214a and the second client devices 214b, respectively. The first camera 211a and the second camera 211b may include digital and analog cameras, video recording devices, and other devices capable of capturing still photographs or moving images.

The first client device 210a may include a display 214a that displays a first video window 215a and a second video window 216a. During a video conference, the first video window 215a may display a camera feed image and a transmitted image of Conference Participant A, and the second video window 216a may display a reconstructed image of Conference Participant B. Similarly, a display 214b of the second client device 210b may include a first video window 215b to display a camera feed image and a transmitted image of Conference Participant B and a second video window 216b to display a reconstructed image of Conference Participant A. For example, the reconstructed image of Conference Participant A shown in the second video window 216b of the second client device 210b may correspond to the transmitted image of Conference Participant A shown in the first video window 215a of the first client device 210a.

The first client device 210a may start a video conferencing program according to an user input from Conference Participant A, and may capture an image of Conference Participant A using the first camera 211a.

The first client device 210a may determine a privacy level according to a user setting or a default setting, among a plurality of privacy levels, such as a high privacy level, a medium-high privacy level, a medium privacy level, a low privacy level, and a zero privacy level, According to the privacy level, the first client device 210a may scrub the image of Conference Participant A to be transformed to a scrubbed feature which contains information of a public attribute, with a minimized amount of information about the original image of Conference Participant A.

The first client device 210a may transmit the scrubbed feature to the second client device 210b through the network 700. Upon receipt of the scrubbed feature, the second client device 210b may estimate the public attribute from the scrubbed feature, and generate a reconstructed image of Conference Participant A based on the estimated public attribute.

Before or while transmitting the scrubbed feature to the second client device 210b, the first client device 210a may also generate its own reconstructed image of Conference Participant A based on the scrubbed feature, and may display the reconstructed image on the first video window 215a. Alternatively, the second client device 210b may transmit the reconstructed image of Conference Participant A to the first client device 210a, so that the first client device 210a may display the reconstructed image received from the second client device 210b on the first video window 215a.

The first client device 210a may scrub the image of Conference Participant A using the encoder neural network 310 illustrated in FIG. 3. 6, or 7. In an embodiment, training process of the encoder neural network 310 may have been completed. In another embodiment, the encoder neural network 310 of the first client device 210a may be updated via a communication with the server 220a. The server 220a may have substantially the same structure of the server 220 illustrated in FIG. 2. 5, or 8 and may perform substantially the same operations as the server 220 as illustrated in FIG. 1-8.

For example, with reference to FIG. 1, the server 220a may perform a public attribute estimating process 120 on the scrubbed feature to estimate a public attribute from the scrubbed feature. The server 220a may perform a first comparison process 130 on the estimated public attribute in comparison with a preset public attribute to calculate a difference between the estimated public attribute and the public attribute label as a first loss. The server 220a may perform a data amount identifying process 140 on the scrubbed feature to identify an amount of data in the scrubbed feature about the original image of Conference Participant A. The server 220a may perform a second comparison process 150 on the identified amount of data in the scrubbed feature about the original image of Conference Participant A in comparison with a threshold data amount. In the second comparison process 130, a difference between the identified amount of data about the original signal and the threshold data amount, is calculated, as a second loss. Based on the first loss and the second loss, the server 220a may update neural network parameters (e.g., weights and biases) of the encoder neural network 310 of the first client device 210a to minimize the first loss and the second loss.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for scrubbing an image, the apparatus comprising:
 a memory storing instructions; and
 a processor configured to execute the instructions to:
  receive an input image;
  input a preset public attribute to an encoder neural network; and
  obtain a scrubbed feature from the input image based on the preset public attribute, via the encoder neural network,
 wherein the encoder neural network is trained based on an amount of information in the scrubbed feature about the input image, and based on an estimated public attribute estimated from the scrubbed feature, and
 the encoder neural network is jointly trained with a target task neural network configured to obtain the estimated public attribute from the scrubbed feature, and a bottleneck neural network configured to determine the amount of information in the scrubbed feature about the input image.

2. The apparatus of claim 1, wherein the processor is further configured to execute the instructions to:
 obtain the scrubbed feature from the input image based on the preset public attribute without inputting a preset private attribute to the encoder neural network.

3. The apparatus of claim 1, wherein the encoder neural network is trained to minimize a sum of a difference between the estimated public attribute and the preset public attribute, and the amount of information in the scrubbed feature about the input image.

4. The apparatus of claim 3, wherein the encoder neural network is determined to be trained to minimize the sum of the difference between the estimated public attribute and the preset public attribute, and the amount of information in the scrubbed feature about the input image, when the sum becomes less than a predetermined threshold value.

5. The apparatus of claim 1, further comprising:
a communication interface configured to establish a connection to an external device comprising the target task neural network,
wherein the processor is further configured to execute the instructions to:
control the communication interface to transmit the scrubbed feature to the target task neural network.

6. The apparatus of claim 1, further comprising:
a display; and
a communication interface configured to establish a connection to an external device comprising the target task neural network configured to obtain the estimated public attribute from the scrubbed feature, and a decoder neural network configured to generate a reconstructed image from the scrubbed feature to reconstruct the input image,
wherein the processor is further configured to execute the instructions to:
control the communication interface to receive the reconstructed image from the external device; and
control the display to display the reconstructed image.

7. The apparatus of claim 1, further comprising a display, wherein the processor is further configured to execute the instructions to:
generate a reconstructed image from the scrubbed feature to reconstruct the input image, via a decoder neural network; and
control the display to display the reconstructed image.

8. The apparatus of claim 1, wherein the processor is further configured to execute the instructions to:
provide a user interface that allows a user to set a privacy level; and
obtain the scrubbed feature from the input image based on the privacy level and the preset public attribute, via the encoder neural network.

9. The apparatus of claim 1, wherein the processor is further configured to execute the instructions to:
extract a content fingerprint from a content presented to a user;
generate a time stamp indicating a time at which the content fingerprint is extracted; and
transmit the content fingerprint and the time stamp to a device configured to obtain the public attribute estimated from the scrubbed feature.

10. An apparatus for scrubbing an image, the apparatus comprising:
a memory storing instructions;
a processor configured to execute the instructions to:
receive a scrubbed feature in which an original input signal is scrubbed based on a preset public attribute;
input the scrubbed feature to a target task neural network; and
extract the preset public attribute from the scrubbed feature, as an estimated public attribute, via the target task neural network,
wherein the target task neural network is trained based on the estimated public attribute, and based on an amount of information in the scrubbed feature about the original input signal, and
the target task neural network is jointly trained with an encoder neural network configured to generate the scrubbed feature, and a bottleneck neural network configured to determine the amount of information in the scrubbed feature about the original input signal.

11. The apparatus of claim 10, wherein the target task neural network is trained to minimize a sum of the difference between the estimated public attribute and the preset public attribute, and the amount of information in the scrubbed feature about the original input signal.

12. The apparatus of claim 10, wherein, when the scrubbed feature is generated based on a preset private attribute and the preset public attribute; the processor is further configured to execute the instructions to:
extract the preset private attribute from the scrubbed feature, via an adversarial neural network.

13. The apparatus of claim 10, wherein, the target task neural network is trained jointly with the encoder neural network configured to generate the scrubbed feature, and the bottleneck neural network configured to determine the amount of information in the scrubbed feature about the original input signal, but separately from training of an adversarial neural network.

14. The apparatus of claim 10, wherein the processor is further configured to execute the instructions to:
input the scrubbed feature to a decoder neural network; and
generate a reconstructed image of the original input signal from the scrubbed feature, via the decoder neural network.

15. A method for scrubbing an image, the method comprising:
receiving an input image;
inputting a preset public attribute to an encoder neural network; and
obtaining a scrubbed feature from the input image based on the preset public attribute, via the encoder neural network,
wherein the encoder neural network is trained based on an amount of information in the scrubbed feature about the input image, and an estimated public attribute estimated from the scrubbed feature, and
the encoder neural network is jointly trained with a target task neural network configured to obtain the estimated public attribute from the scrubbed feature, and a bottleneck neural network configured to determine the amount of information in the scrubbed feature about the input image.

16. The method of claim 15, wherein the obtaining the scrubbed feature comprises:
obtaining the scrubbed feature from the input image based on the preset public attribute without inputting a preset private attribute to the encoder neural network.

17. The method of claim 15, wherein the encoder neural network is trained to minimize a sum of a difference between the estimated public attribute and the preset public attribute, and the amount of information in the scrubbed feature about the input image.

18. The method of claim 15, further comprising:
establishing a connection to an external device comprising the target task neural network; and
transmitting the scrubbed feature to the target task neural network.

19. The method of claim 15, further comprising:
establishing a connection to an external device comprising the target task neural network configured to obtain the estimated public attribute from the scrubbed feature, and a decoder neural network configured to generate a reconstructed image from the scrubbed feature to reconstruct the input image,
receiving the reconstructed image from the external device; and
displaying the reconstructed image.

20. The method of claim 15, further comprising:
generating a reconstructed image from the scrubbed feature to reconstruct the input image, via a decoder neural network; and
displaying the reconstructed image.

21. The method of claim 15, further comprising:
providing a user interface that allows a user to set a privacy level; and
obtaining the scrubbed feature from the input image based on the privacy level and the preset public attribute, via the encoder neural network.

22. A non-transitory computer-readable storage medium storing a program that is executable by a computer to perform the method of scrubbing the image of claim 15.

23. A method of scrubbing an image, the method comprising:
receiving a scrubbed feature in which an original input signal is scrubbed based on a preset public attribute;
inputting the scrubbed feature to a target task neural network; and
extracting the preset public attribute from the scrubbed feature, as an estimated public attribute, via the target task neural network,
wherein the target task neural network is trained based on the estimated public attribute, and an amount of information in the scrubbed feature about the original input signal, and
the target task neural network is jointly trained with an encoder neural network configured to generate the scrubbed feature, and a bottleneck neural network configured to determine the amount of information in the scrubbed feature about the original input signal.

24. The method of claim 23, wherein the target task neural network is trained to minimize a sum of the difference between the estimated public attribute and the preset public attribute, and the amount of information in the scrubbed feature about the original input signal.

25. The method of claim 23, wherein, when the scrubbed feature is generated based on a preset private attribute and the preset public attribute, the method further comprises:
extracting the preset private attribute from the scrubbed feature, as an estimated private attribute, via an adversarial neural network.

26. The method of claim 23, wherein, the target task neural network is trained jointly with the encoder neural network configured to generate the scrubbed feature, and the bottleneck neural network configured to determine the amount of information in the scrubbed feature about the original input signal, but separately from training of an adversarial neural network.

* * * * *